US012664619B2

(12) United States Patent
Liu et al.

(10) Patent No.: US 12,664,619 B2
(45) Date of Patent: Jun. 23, 2026

(54) METHOD AND SYSTEM FOR IMAGE ENHANCEMENT

(71) Applicant: WUHAN UNITED IMAGING HEALTHCARE CO., LTD., Wuhan (CN)

(72) Inventors: Anyi Liu, Wuhan (CN); Chuandong Li, Wuhan (CN); Zhixin Tian, Wuhan (CN); Hao Ling, Wuhan (CN); Jianmin Zhang, Wuhan (CN)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 302 days.

(21) Appl. No.: 18/346,253

(22) Filed: Jul. 2, 2023

(65) Prior Publication Data

US 2023/0351557 A1 Nov. 2, 2023

Related U.S. Application Data

(63) Continuation of application No. PCT/CN2022/139501, filed on Dec. 16, 2022.

(30) Foreign Application Priority Data

| | | |
|---|---|---|
| Jan. 18, 2022 | (CN) | 202210052627.6 |
| Sep. 27, 2022 | (CN) | 202211183232.6 |
| Sep. 27, 2022 | (CN) | 202211186738.2 |

(51) Int. Cl.
*G06T 5/00* (2024.01)
*G06T 5/50* (2006.01)
(Continued)

(52) U.S. Cl.
CPC ............... *G06T 5/70* (2024.01); *G06T 5/50* (2013.01); *G06T 7/13* (2017.01);
(Continued)

(58) Field of Classification Search
CPC .... G06T 5/70; G06T 5/50; G06T 7/13; G06T 2207/10132; G06T 2207/20192; G06T 2207/20221; G06T 5/73
See application file for complete search history.

(56) References Cited

U.S. PATENT DOCUMENTS

| | | | |
|---|---|---|---|
| 2014/0064613 A1* | 3/2014 | Wu | H04N 1/409 |
| | | | 382/167 |
| 2014/0341481 A1 | 11/2014 | Panetta et al. | |

FOREIGN PATENT DOCUMENTS

| | | |
|---|---|---|
| CN | 1892696 A | 1/2007 |
| CN | 101452574 A | 6/2009 |

(Continued)

OTHER PUBLICATIONS

Kleinnijenhuis et al., "Structure Tensor Informed Fiber Tractography (STIFT) by combining gradient echo MRI and diffusion weighted imaging", pub. 2011 (Year: 2011).*

(Continued)

*Primary Examiner* — Mekonen T Bekele
(74) *Attorney, Agent, or Firm* — METIS IP LLC

(57) ABSTRACT

The present disclosure provides methods and systems for image enhancement. The methods may include obtaining an initial image. The methods may include obtaining a first image and a second image by performing speckle noise reduction and edge enhancement on the initial image, respectively. The methods may further include determining a target image by performing a fusion operation on the first image and the second image.

16 Claims, 12 Drawing Sheets

(51) Int. Cl.
_G06T 5/70_ (2024.01)
_G06T 7/13_ (2017.01)

(52) U.S. Cl.
CPC .............. _G06T 2207/10132_ (2013.01); _G06T 2207/20192_ (2013.01); _G06T 2207/20221_ (2013.01)

(56) References Cited

FOREIGN PATENT DOCUMENTS

| | | | | |
|----|-----------|---|---------|------------|
| CN | 101459766 | A | 6/2009 | |
| CN | 101877122 | A | 11/2010 | |
| CN | 102663692 | A * | 9/2012 | |
| CN | 104504670 | A | 4/2015 | |
| CN | 105957030 | A | 9/2016 | |
| CN | 106600550 | A | 4/2017 | |
| CN | 106875353 | A | 6/2017 | |
| CN | 106886981 | A | 6/2017 | |
| CN | 107680057 | A | 2/2018 | |
| CN | 109886901 | A | 6/2019 | |
| CN | 109949254 | A | 6/2019 | |
| CN | 111652809 | A * | 9/2020 | .............. G06F 18/24 |
| CN | 106725812 | B | 10/2020 | |
| CN | 114519675 | A | 5/2022 | |
| CN | 114782283 | A | 7/2022 | |
| CN | 114782464 | A | 7/2022 | |
| CN | 114862700 | A | 8/2022 | |

| | | | | | |
|----|-------------|---|---|--------|------------|
| JP | 2005058570 | A | * | 3/2005 | |
| KR | 20100040354 | A | | 4/2010 | |
| WO | WO-2021179223 | A1 | * | 9/2021 | .............. H04N 23/70 |

OTHER PUBLICATIONS

International Search Report in PCT/CN2022/139501 mailed on Feb. 15, 2023, 7 pages.

Written Opinion in PCT/CN2022/139501 mailed on Feb. 15, 2023, 5 pages.

Fan Zhang et al., Nonlinear Diffusion in Laplacian Pyramid Domain for Ultrasonic Speckle Reduction, IEEE Transactions on Medical Imaging, 26(2): 200-211, 2007.

Siham Tabik et al., Multiprocessing of Anisotropic Nonlinear Diffusion for Filtering 3D Images, Proceeding of the 14th Euromicro International Conference on Parallel, Distributed, and Network-Based Processing (PDP'06), 2006, 7 pages.

Laura Fritz, Diffusion-Based Applications for Interactive Medical Image Segmentation, Computer Science, 2006, 8 pages.

First Office Action in Chinese Application No. 202211183232.6 mailed on Jul. 26, 2025, 23 pages.

Jiao, Weichao et al., Improved Canny Edge Detection Algorithm Combined with Wavelet Denoising, Journal of Hubei Polytechnic University, 32(2): 23-26, 2016.

First Office Action in Chinese Application No. 202210052627.6 mailed on May 30, 2025, 20 pages.

Lin, Hong et al., Fingerprint Image Enhancement: Algorithm and Performance Evaluation, IEEE Transactions on Pattern Analysis and Machine Intelligence, 20(8): 777-789, 1998.

* cited by examiner

100

300

Obtaining an initial image    310

Obtaining a first image and a second image by performing speckle noise reduction and edge enhancement on the initial image, respectively    320

Determining a target image by performing a fusion operation on the first image and the second image    330

400

500

<u>600</u>

<u>700</u>

<u>800</u>

<u>900</u>

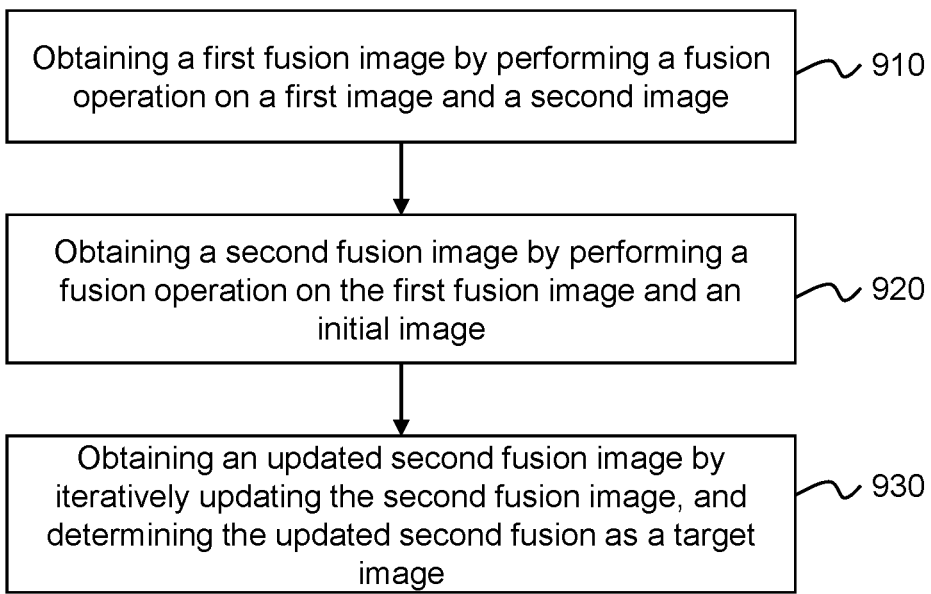

Obtaining a first fusion image by performing a fusion operation on a first image and a second image    910

Obtaining a second fusion image by performing a fusion operation on the first fusion image and an initial image    920

Obtaining an updated second fusion image by iteratively updating the second fusion image, and determining the updated second fusion as a target image    930

METHOD AND SYSTEM FOR IMAGE ENHANCEMENT

CROSS-REFERENCE TO RELATED APPLICATIONS

This application is a Continuation of International Application No. PCT/CN2022/139501 filed on Dec. 16, 2022, which claims priority of Chinese Patent Application No. 202211183232.6 filed on Sep. 27, 2022, Chinese Patent Application No. 202210052627.6 filed on Jan. 18, 2022, and Chinese Patent Application No. 202211186738.2 filed on Sep. 27, 2022, the contents of each of which are hereby incorporated by reference.

TECHNICAL FIELD

The present disclosure generally relates to the field of medical imaging, and more particularly, relates to method and system for image enhancement.

BACKGROUND

An ultrasound imaging technique is one of the most widely used medical imaging techniques. The ultrasound imaging technique can be used to obtain visible images of subjects by using ultrasonic waves. An ultrasound imaging system receives echo signals from a structure to be scanned, and displays intensities of the echo signals in the form of brightness. Ultrasound images obtained by the ultrasound imaging system are usually processed (e.g., speckle noise reduction, edge enhancement), and then be provided for the medical staff for diagnosis. The speckle noise reduction refers to the reduction of the speckle noise(s). The ultrasound images often have speckle noise(s), which affects the image quality. Therefore, reducing the speckle noise(s) in the ultrasound images is an important operation in the ultrasound image processing. At the same time, multiplicative speckle noise(s) in the ultrasound images may mask tiny details and reduce the detectability of low-contrast lesions. The image quality of the ultrasound images may be significantly improved by performing the image enhancement on the ultrasound images. In traditional noise reduction techniques, the speckle noise reduction is mainly performed on the ultrasound images by using various filtering algorithms (e.g., a non-local mean filtering algorithm, an anisotropic diffusion-based algorithm, a multi-scale filtering-based algorithm, etc.). In enhancement techniques, the edge enhancement is mainly performed on the ultrasound images by using various edge enhancement algorithms (e.g., an improved unsharp mask-based algorithm, a directional filter enhancement-based algorithm, etc.). However, a portion of pixel information of non-noise pixels may be removed while filtering the noise(s) using the noise reduction techniques, resulting in the elimination of a portion of details of the ultrasound images, and excessive blurring of the ultrasound images. Therefore, the requirements of the speckle noise reduction and the image definition may not be satisfied at the same time. Moreover, the algorithms for the speckle noise reduction and the edge enhancement may have problems such as poor adaptability, rough mask results, and large calculation amount.

Therefore, it is desirable to provide methods and systems for image enhancement to improve the image quality of the ultrasound images, reduce the calculation amount, and meet real-time requirements.

SUMMARY

According to an aspect of the present disclosure, a method for image enhancement is provided. The method may be implemented on a computing device having at least one processor and at least one storage device. The method may include obtaining an initial image. The method may include obtaining a first image and a second image by performing speckle noise reduction and edge enhancement on the initial image, respectively. The method may further include determining a target image by performing a fusion operation on the first image and the second image.

In some embodiments, the method may further include performing a filtering operation on the initial image.

In some embodiments, the performing speckle noise reduction and edge enhancement on the initial image, respectively, may include determining a structure tensor of the initial image; and performing the speckle noise reduction and the edge enhancement on the initial image based on the structure tensor, respectively.

In some embodiments, the performing the speckle noise reduction and the edge enhancement on the initial image based on the structure tensor, respectively, may include determining a diffusion tensor of the initial image based on the structure tensor; and performing the speckle noise reduction on the initial image based on the diffusion tensor to obtain the first image.

In some embodiments, the determining a diffusion tensor of the initial image based on the structure tensor may include determining at least one eigenvector and at least one eigenvalue of the structure tensor; obtaining at least one corrected eigenvalue by correcting the at least one eigenvalue; and determining the diffusion tensor based on the at least one eigenvector and the at least one corrected eigenvalue.

In some embodiments, the at least one eigenvector may include a two-dimensional (2D) eigenvector or a three-dimensional (3D) eigenvector. The at least one eigenvalue may include two eigenvalues corresponding to the 2D eigenvector or three eigenvalues corresponding to the 3D eigenvector. The correcting the at least one eigenvalue may include obtaining two corrected eigenvalues or three corrected eigenvalues by correcting the at least one eigenvalue in a homogeneous tissue region and an edge region in the initial image. A difference between the two corrected eigenvalues or the three corrected eigenvalues in the homogeneous tissue region may be less than or equal to a first preset threshold, and a diffusion of a maximum value among the two corrected eigenvalues or the three corrected eigenvalues may be terminated in the edge region.

In some embodiments, the performing the speckle noise reduction on the initial image based on the diffusion tensor to obtain the first image may include obtaining anisotropic diffusion information of the initial image based on the diffusion tensor and image gradient information of the initial image, the anisotropic diffusion information representing a change rate of a gray value of the initial image at a certain time point; and performing the speckle noise reduction on the initial image based on the anisotropic diffusion information to obtain the first image.

In some embodiments, the performing the speckle noise reduction and the edge enhancement on the initial image based on the structure tensor, respectively, may include determining an image mask and a direction map of the initial image based on the structure tensor; and performing the edge enhancement on the initial image based on the image mask and the direction map to obtain the second image.

In some embodiments, the determining an image mask and a direction map of the initial image based on the structure tensor may include determining at least one eigenvalue of the structure tensor; and determining the image mask based on the at least one eigenvalue.

In some embodiments, the determining an image mask and a direction map of the initial image based on the structure tensor may include determining at least one eigenvector of the structure tensor; and determining the direction map based on the at least one eigenvector.

In some embodiments, the performing the edge enhancement on the initial image based on the image mask and the direction map to obtain the second image may include performing a filtering operation on the initial image based on the image mask and the direction map to obtain the second image.

In some embodiments, the performing the speckle noise reduction and the edge enhancement on the initial image based on the structure tensor, respectively, may include determining at least one eigenvalue of the structure tensor; obtaining an image edge region of the initial image by performing edge extraction on the initial image based on the at least one eigenvalue; and performing the edge enhancement on the image edge region to obtain the second image.

In some embodiments, the at least one eigenvalue may include three eigenvalues. The obtaining an image edge region of the initial image by performing edge extraction on the initial image based on the at least one eigenvalue may include for each pixel in the initial image, determining two target eigenvalues of the pixel from the three eigenvalues corresponding to the pixel, the two target eigenvalues including a maximum eigenvalue and a minimum eigenvalue among the three eigenvalues, determining whether a difference between the two target eigenvalues is greater than a second preset threshold, and in response to determining that the difference between the two target eigenvalues is greater than the second preset threshold, determining that the pixel is located at an image edge of the initial image; and obtaining the image edge region based on a plurality of pixels located at the image edge of the initial image.

In some embodiments, the performing the speckle noise reduction and the edge enhancement on the initial image based on the structure tensor, respectively, may include determining at least one eigenvalue of the structure tensor; obtaining at least one corrected eigenvalue by correcting the at least one eigenvalue; and performing the speckle noise reduction and/or the edge enhancement on the initial image based on the at least one corrected eigenvalue, respectively.

In some embodiments, the speckle noise reduction and the edge enhancement may be performed in parallel.

In some embodiments, the determining a target image by performing a fusion operation on the first image and the second image may include obtaining a screened second image by screening the second image; and obtaining the target image by fusing the first image and the screened second image.

In some embodiments, the determining a target image by performing a fusion operation based on the first image and the second image may include obtaining a first fusion image by performing a fusion operation on the first image and the second image; obtaining a second fusion image by performing a fusion operation on the first fusion image and the initial image; obtaining an updated second fusion image by iteratively updating the second fusion image; and determining the updated second fusion image as the target image. The iteratively updating the second fusion image may include designating the second fusion image as an updated initial image; and iteratively updating the second fusion image until an iteration termination condition is satisfied.

In some embodiments, the iteratively updating the second fusion image may include one or more iterations, and each of the one or more iterations may include obtaining an updated first image and an updated second image by performing the speckle noise reduction and the edge enhancement on the updated initial image, respectively; obtaining an updated first fusion image by performing a fusion operation on the updated first image and the updated second image; and obtaining the updated second fusion image by performing a fusion operation on the updated first fusion image and the updated initial image.

In some embodiments, the obtaining a first fusion image by performing a fusion operation on the first image and the second image may include obtaining a screened second image by screening the second image; and obtaining the first fusion image by fusing the first image and the screened second image.

In some embodiments, the obtaining the first fusion image by fusing the first image and the screened second image may include obtaining the first fusion image by fusing the first image and the screened second image based on a first weighting value corresponding to the first image and a second weighting value corresponding to the screened second image. The first weighting value may be negatively correlated to the second weighting value.

In some embodiments, the obtaining a second fusion image by performing a fusion operation on the first fusion image and the initial image may include obtaining the second fusion image by fusing the first fusion image and the initial image based on a third weighting value corresponding to the first fusion image and a fourth weighting value corresponding to the initial image. A sum of the third weighting value and the fourth weighting value may be 1.

In some embodiments, the iteration termination condition may be determined based on an image processing rate requirement and/or an image quality requirement.

In some embodiments, the iteration termination condition may include that a count of iterations reaches a preset count or a change degree between gray values of two second fusion images obtained in two adjacent iterations is less than a third preset threshold.

According to another aspect of the present disclosure, a system for image enhancement is provided. The system may include an image obtaining module, an image processing module, and an image fusion module. The image acquisition module may be configured to obtain an initial image. The image processing module may be configured to obtain a first image and a second image by performing speckle noise reduction and edge enhancement on the initial image, respectively. The image fusion module may be configured to determine a target image by performing a fusion operation on the first image and the second image.

According to still another aspect of the present disclosure, a system for image enhancement is provided. The system may include at least one storage device including a set of instructions; and at least one processor configured to communicate with the at least one storage device. When executing the set of instructions, the at least one processor may be configured to direct the system to perform operations. The operations may include obtaining an initial image. The operations may include obtain a first image and a second image by performing speckle noise reduction and edge enhancement on the initial image, respectively. The operations may further include determining a target image by performing a fusion operation based on the first image and the second image.

According to still another aspect of the present disclosure, a device for image enhancement is provided. The device may include at least one storage device, and the at least one storage device may be configured to perform the method for image enhancement.

According to still another aspect of the present disclosure, a non-transitory computer-readable medium is provided. The non-transitory computer-readable medium may store at least one set of instructions. When executed by at least one processor, the at least one set of instructions may direct the at least one processor to perform the method for image enhancement.

According to some embodiments of the present disclosure, by performing the speckle noise reduction and the edge enhancement on the ultrasound image in parallel based on the structure tensor, the calculation may be accelerated and repeated operations may be reduced, which improves the efficiency of the ultrasound image processing. By obtaining the image mask based on the structure tensor, an accuracy of an area of interest to be filtered can be improved, which avoids unnecessary calculations, and improves the operation efficiency and filtering efficiency. By obtaining the direction map based on the structure tensor, the calculation amount of the direction map can be reduced. The corrected direction map may include accurate pixel direction information, which can be used to improve the edge enhancement effect significantly. A result image that is obtained by performing the edge enhancement and a result image that is obtained by performing the speckle noise reduction may be fused, which may effectively avoid introducing too much noise(s) into the edge enhancement result. The operations may be applied to two-dimensional (2D) ultrasound images and three-dimensional (3D) ultrasound images, which improves the adaptability of the speckle noise reduction and the edge enhancement on various types of images, so that the ultrasound images can be corrected more easily and conveniently.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

6

Figure 7:
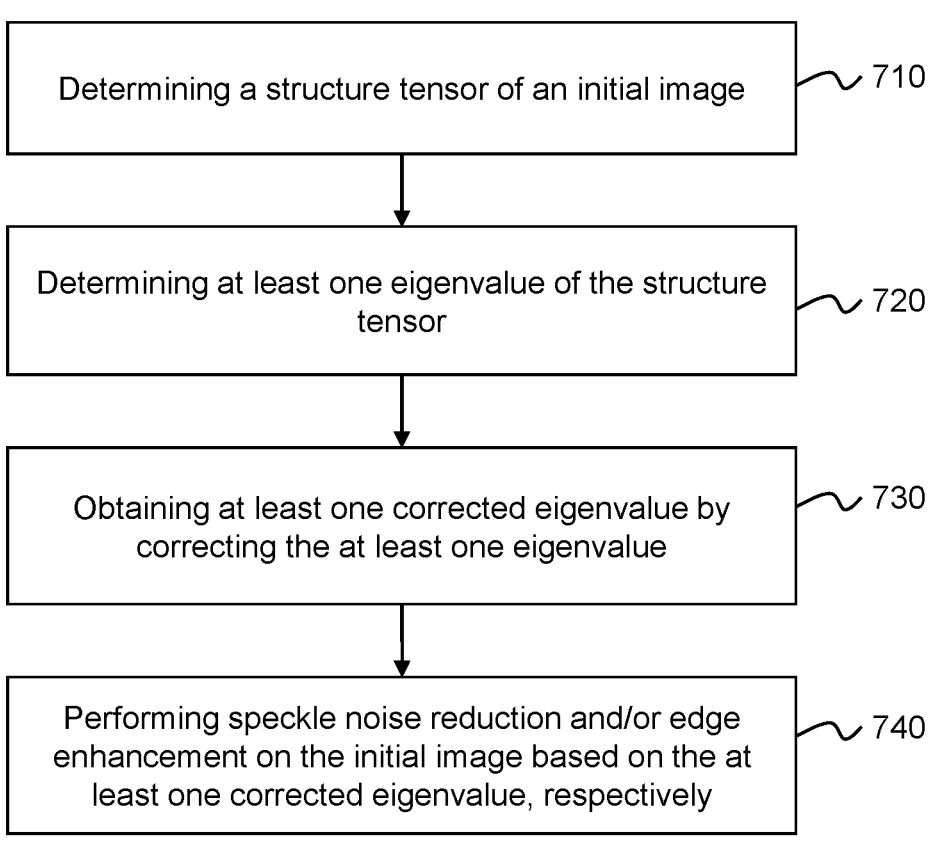
Figure 8:
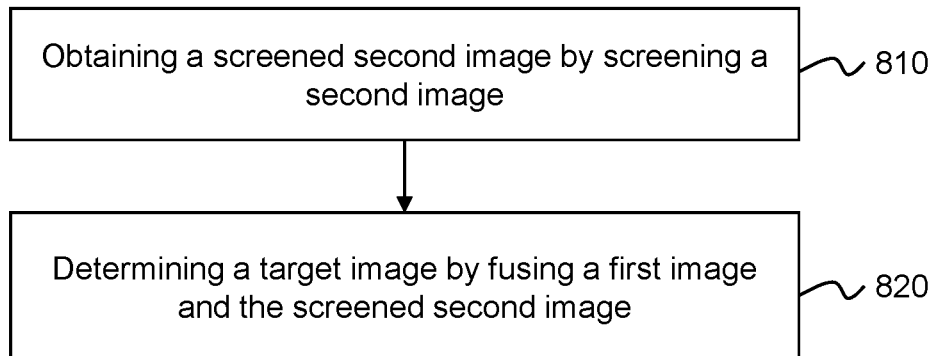
Figure 10A:
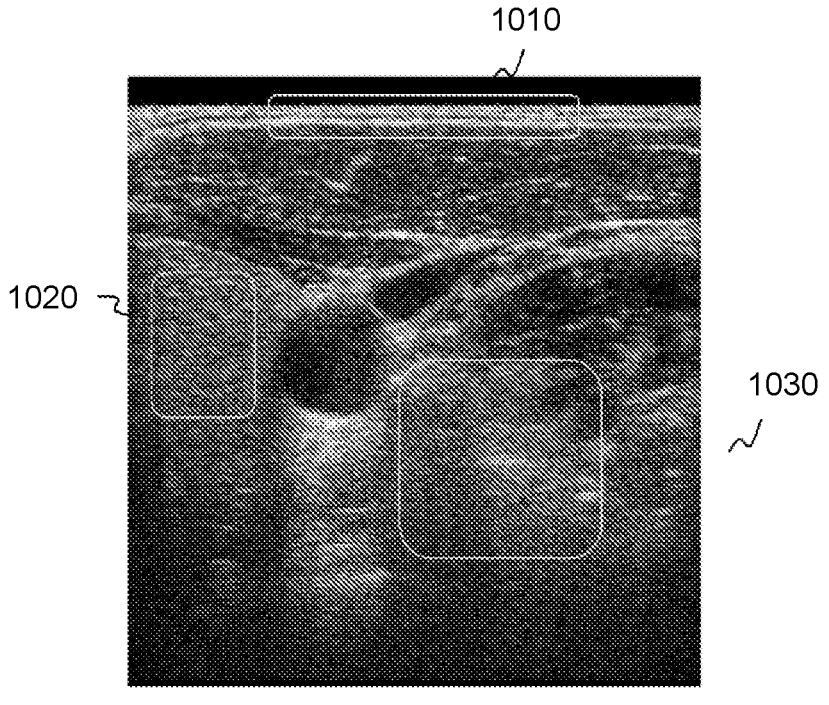
Figure 10B:
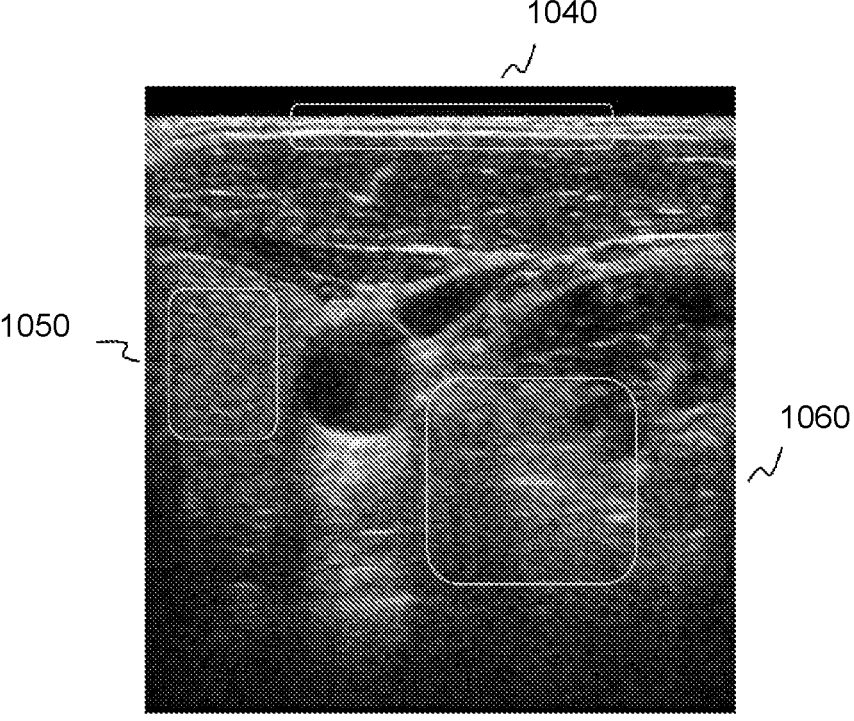
Figure 11:
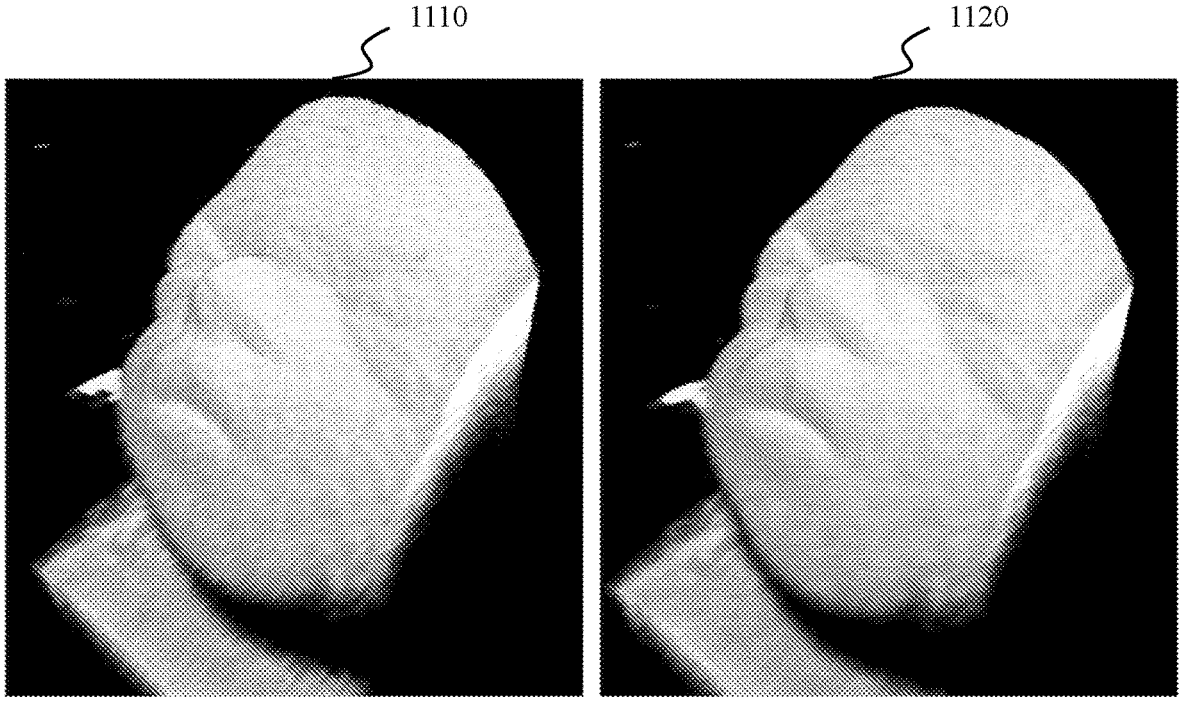
Figure 12:
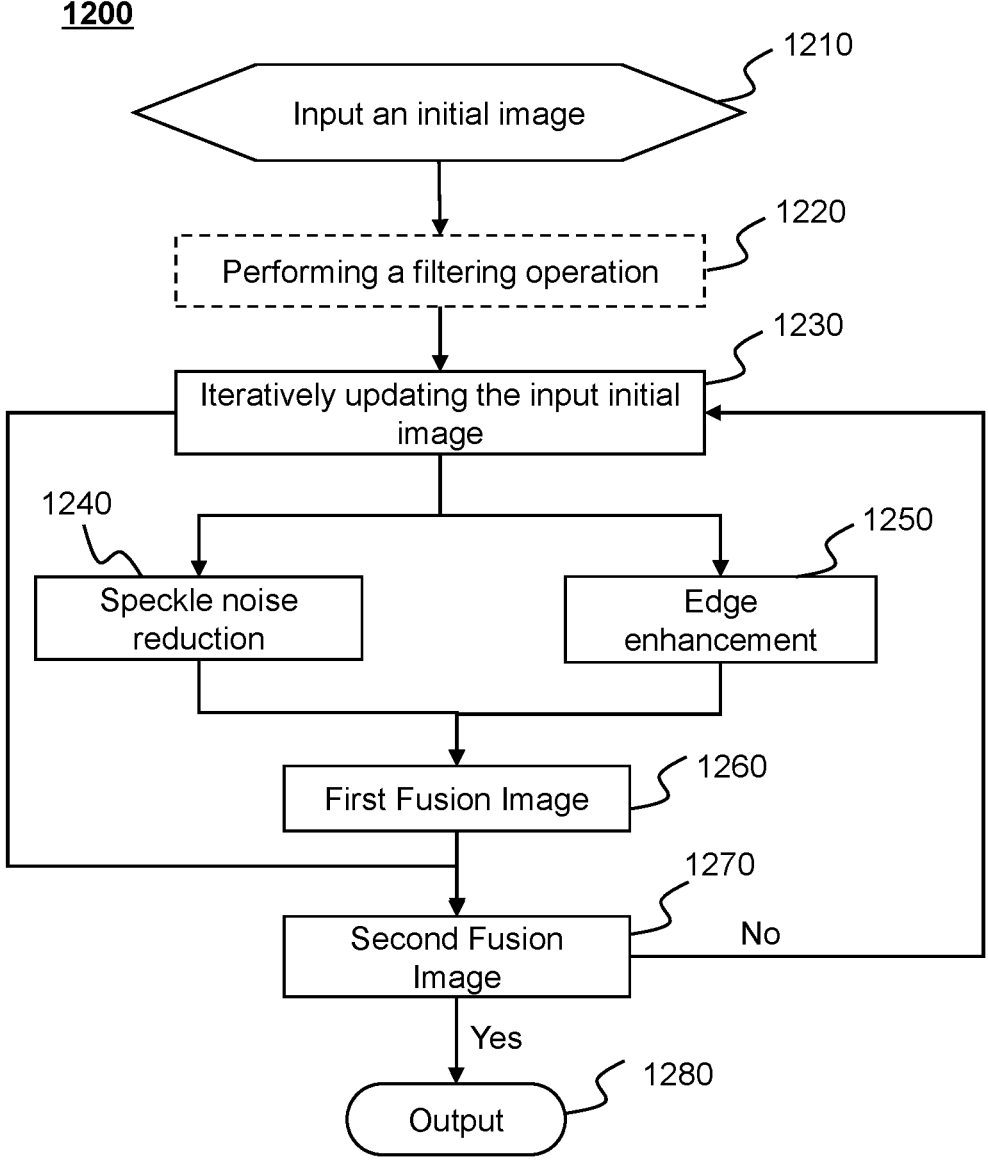
Figure 13:
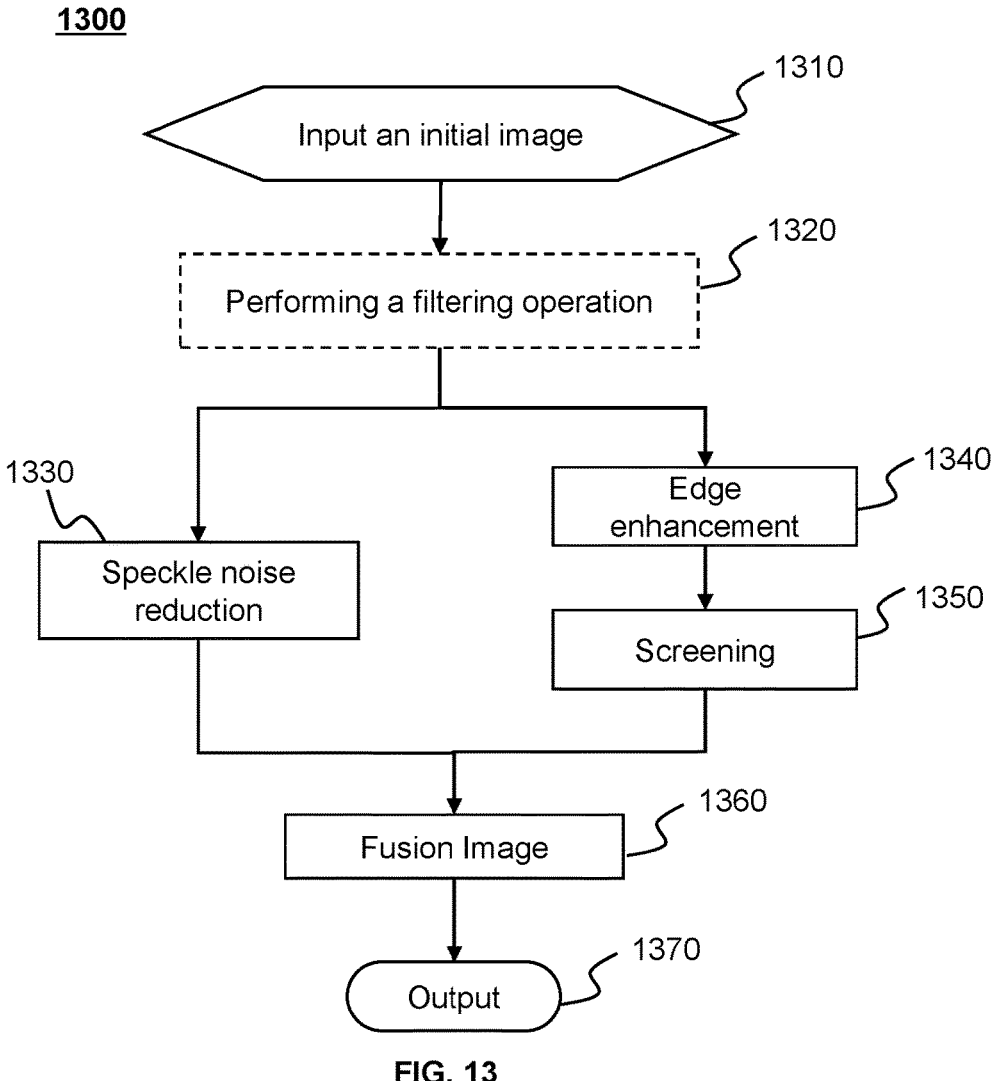
Figure 14:
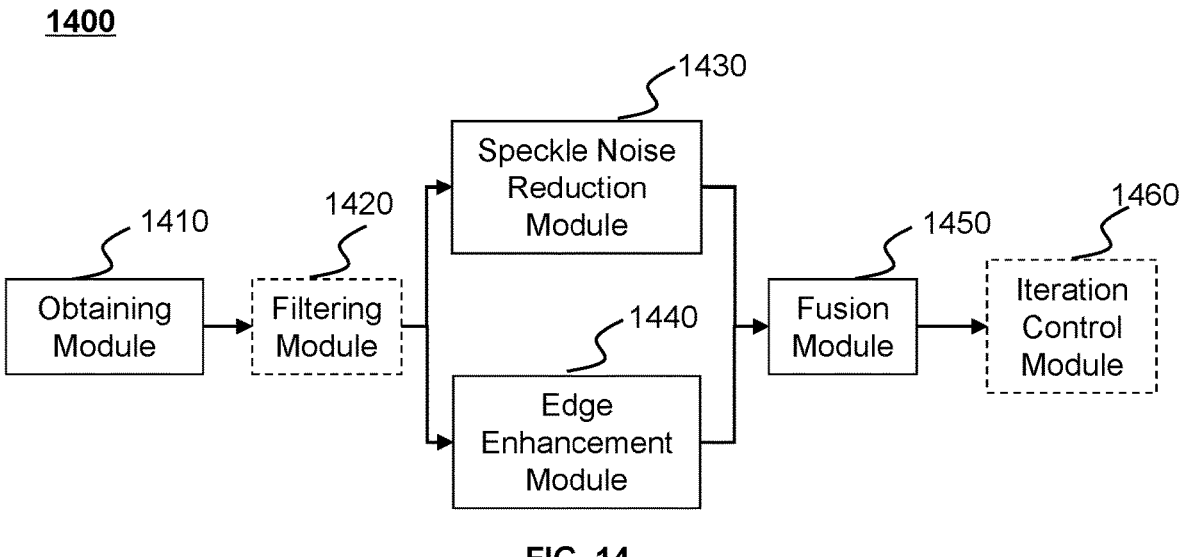
Figure 15:
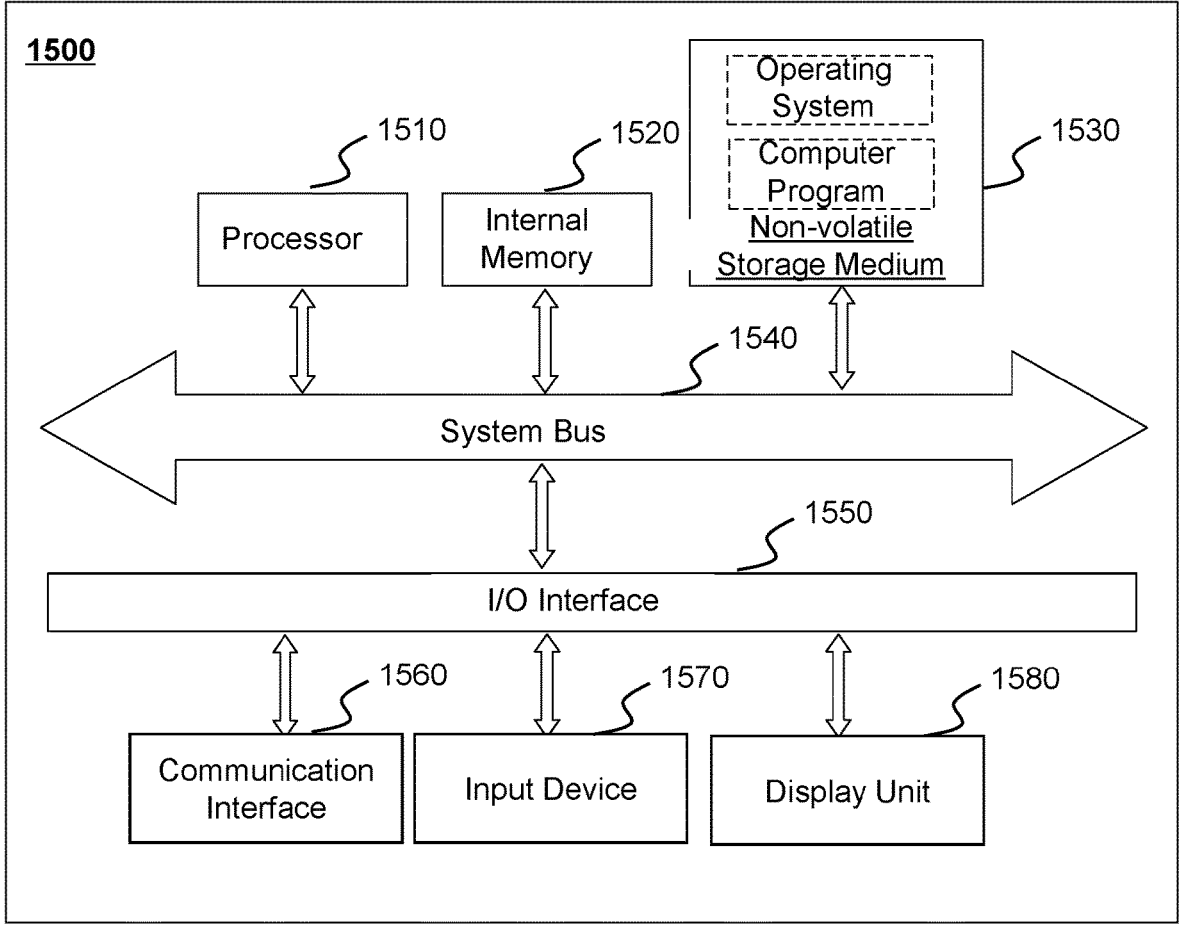

FIG. 7 is a flowchart illustrating an exemplary process for image enhancement according to some embodiments of the present disclosure;

FIG. 8 is a flowchart illustrating an exemplary process for image enhancement according to some embodiments of the present disclosure;

FIG. 9 is a flowchart illustrating an exemplary process for image enhancement according to some embodiments of the present disclosure;

FIGS. 10A and 10B are schematic diagrams illustrating an exemplary initial two-dimensional ultrasound image and an exemplary enhanced two-dimensional ultrasound image according to some embodiments of the present disclosure;

FIG. 11 is a schematic diagram illustrating an exemplary initial three-dimensional ultrasound image and an exemplary enhanced three-dimensional ultrasound image according to some embodiments of the present disclosure;

FIG. 12 is a schematic diagram illustrating an exemplary process for image enhancement according to some embodiments of the present disclosure;

FIG. 13 is a schematic diagram illustrating an exemplary process for image enhancement according to some embodiments of the present disclosure;

FIG. 14 is a block diagram illustrating an exemplary image enhancement system according to some embodiments of the present disclosure; and FIG. 15 is a schematic diagram illustrating an exemplary image enhancement device according to some embodiments of the present disclosure.

DETAILED DESCRIPTION

In order to more clearly illustrate the technical solutions of the embodiments of the present disclosure, the accompanying drawings that need to be used in the descriptions of the embodiments will be briefly introduced below. Obviously, the accompanying drawings below are merely some examples or embodiments of the descriptions. For ordinary skilled in the art, the present disclosure may be applied to other similar scenarios according to the accompanying drawings without creative effort. Unless otherwise apparent from context or otherwise indicated, the same reference numerals in the figures represent the same structures or operations.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

As used herein, the singular forms "a," "an," and "the" may be intended to include the plural forms as well, unless the context clearly indicates otherwise. It will be further understood that the terms "comprise" and/or "include" when used in this specification, specify the presence of stated operations and/or elements, but do not preclude the presence or addition of one or more other operations and/or elements thereof.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Figure 1:
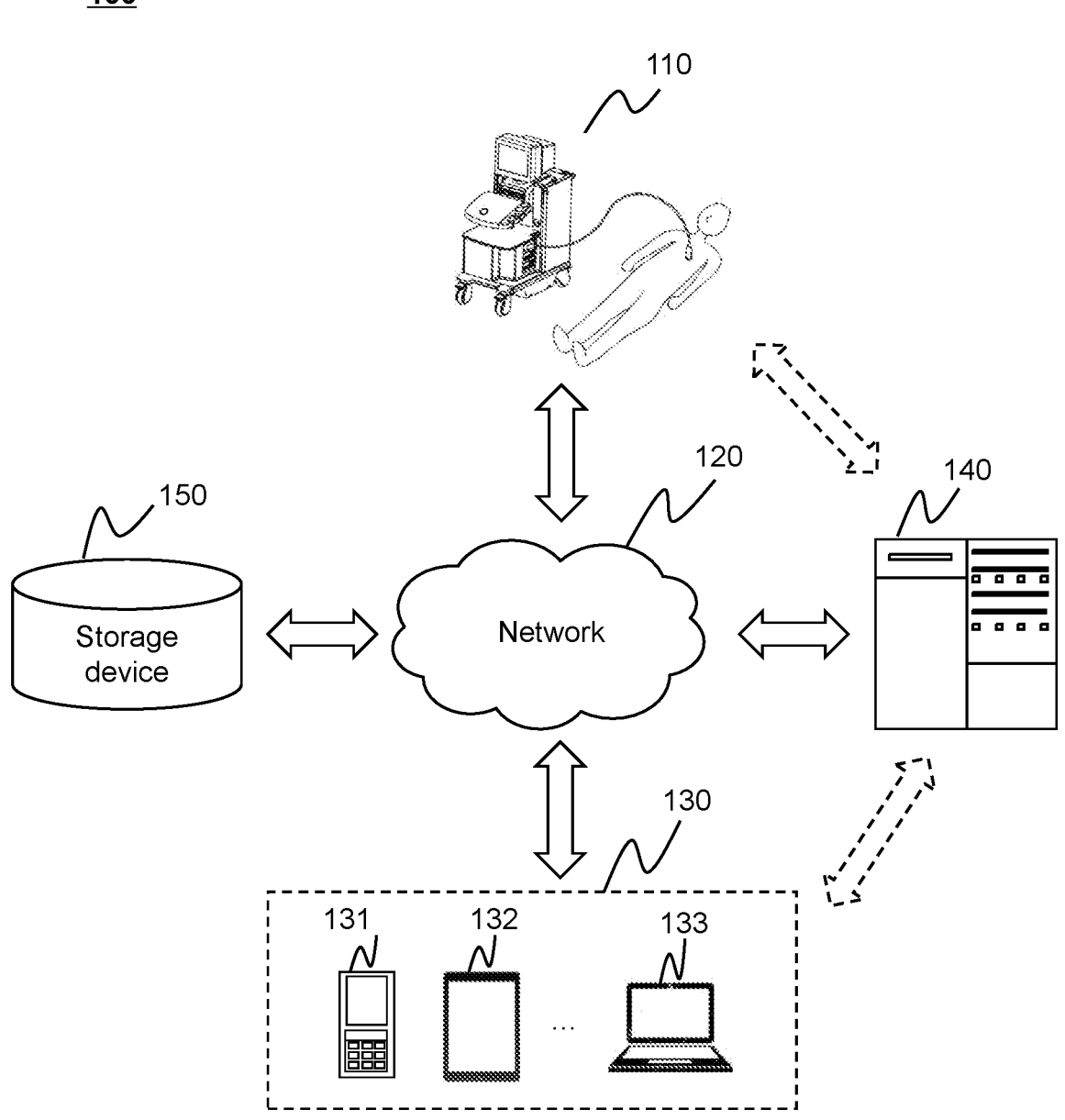
FIG. 1 is a schematic diagram illustrating an exemplary image enhancement system according to some embodiments of the present disclosure.

FIG. 1 is a schematic diagram illustrating an exemplary image enhancement system 100 according to some embodiments of the present disclosure.

As illustrated in FIG. 1, the image enhancement system 100 (also referred to as the system 100 for image enhancement) may include an ultrasonic device 110, a network 120, terminal(s) 130, a processing device 140, and a storage device 150.

The ultrasonic device 110 may be used to perform a scan on a subject for diagnostic imaging. The ultrasonic device 110 may be used to view image information of internal tissues of the subject to assist a doctor in disease diagnosis. The ultrasonic device 110 may send sound waves with relatively high frequencies (e.g., ultrasounds) to the subject through a probe to generate an ultrasound image. In some embodiments, the ultrasonic device 110 may include an ultrasonic pulse-echo imaging device, an ultrasonic echo Doppler imaging device, an ultrasonic electronic endoscope, an ultrasonic Doppler blood flow analysis device, an ultrasonic human tissue measurement device, etc. In some embodiments, the subject may include a biological subject and/or a non-biological subject. For example, the subject may include a specific portion of a human body, such as, the neck, the chest, the abdomen, or the like, or any combination thereof. As another example, the subject may be a patient to be scanned by the ultrasonic device 110. In some embodiments, the subject to be scanned may be subjected to ultrasound examination in any position, such as, a supine position, a lateral position, a prone position, a semi-recumbent position, or a sitting position. In some embodiments, a scanning mode of the ultrasonic device 110 may include A-scan ultrasonography, B-scan ultrasonography, M-scan ultrasonography, and/or D-scan ultrasonography. In some embodiments, the ultrasonic device 110 may be disposed in a medical care place or facility, such as, a medical examination center, a ward, a delivery room, an examination room, an operating room, a rescue room, an ambulance, etc. In some embodiments, the ultrasonic device 110 may be disposed in other places, such as, a marathon venue, an extreme sports venue, a racing venue, a disaster relief site, etc. In some embodiments, the ultrasonic device 110 may also receive imaging subject information and/or imaging operation instruction information sent from the terminal(s) 130 or the processing device 140 through the network 120, and may send intermediate imaging result data or imaging images to the processing device 140, the storage device 150, or the terminal(s) 130.

The network 120 may include any suitable network that facilitates the system 100 to exchange information and/or data. In some embodiments, one or more other components (e.g., the ultrasonic device 110, the terminal(s) 130, the processing device 140, the storage device 150, etc.) of the system 100 may exchange information and/or data with each other via the network 120. For example, the processing device 140 may obtain image data from the ultrasonic device 110 via the network 120. As another example, the processing device 140 may obtain user instructions from the terminal(s) 130 via the network 120. The network 120 may include a public network (e.g., the Internet), a private network (e.g., a local area network (LAN), a wide area network (WAN), etc.), a wired network (e.g., the Ethernet, etc.), a wireless network (e.g., an 802.11 network, a Wi-Fi network, etc.), a cellular network (e.g., an LTE network, etc.), a frame relay network, a virtual private network (VPN), a satellite network, a telephone network, or the like, or any combination thereof. In some embodiments, the network 120 may include one or more network access points. For example, the network 120 may include wired and/or wireless network access points, such as, base stations and/or network switching points, through which one or more components of the system 100 may access the network 120 to exchange data and/or information.

The terminal(s) 130 may control operation(s) of the ultrasonic device 110. In some embodiments, the user may issue an operation instruction to the ultrasonic device 110 through the terminal(s) 130, so that the ultrasonic device 110 completes a specific operation, such as, imaging a specific body part of a patient. In some embodiments, the terminal(s) 130 may direct the processing device 140 to execute the image enhancement method as illustrated in some embodiments of the present disclosure. In some embodiments, a fused target image may be presented to a user through the terminal(s) 130. In some embodiments, the terminal(s) 130 may be a mobile device 131, a tablet computer 132, a laptop computer 133, a desktop computer, or the like, or any combination thereof, that have input and/or output functions. In some embodiments, the terminal(s) 130 may be a portion of the processing device 140. In some embodiments, the terminal(s) 130 may be a portion of the ultrasonic device 110.

The processing device 140 may process data and/or information obtained from the ultrasonic device 110, the terminal(s) 130, and/or the storage device 150. For example, the processing device 140 may obtain an ultrasound image from the ultrasonic device 110, and perform speckle noise reduction and/or edge enhancement on the ultrasound image. In some embodiments, the processing device 140 may be a server or a server group. The server group may be centralized or distributed. In some embodiments, processing device 140 may be local or remote. For example, the processing device 140 may access information and/or data stored in the ultrasonic device 110, the terminal(s) 130, and/or the storage device 150 via network 120. As another example, the processing device 140 may be directly connected to the ultrasonic device 110, the terminal(s) 130, and/or the storage device 150 to access the information and/or data stored therein. In some embodiments, the processing device 140 may be executed on a cloud platform. For example, the cloud platform may include a private cloud, a public cloud, a hybrid cloud, a community cloud, a distributed cloud, an interconnected cloud, a multiple cloud, or the like, or any combination thereof. In some embodiments, the processing device 140 may be a portion of the ultrasonic device 110 or the terminal(s) 130.

The storage device 150 may store data, instructions, and/or other information. In some embodiments, the storage device 150 may store data obtained from the terminal(s) 130 and/or the processing device 140. In some embodiments, the storage device 150 may store data and/or instructions executed or used by the processing device 140 to perform the exemplary methods described herein. In some embodiments, the storage device 150 may include a mass storage, a removable storage, a volatile read-write storage, a read-only memory (ROM), or the like, or any combination thereof. In some embodiments, the storage device 150 may be implemented on a cloud platform. For example, the cloud platform may include a private cloud, a public cloud, a hybrid cloud, a community cloud, a distributed cloud, an interconnected cloud, a multi-cloud, or the like, or any combination thereof.

In some embodiments, the storage device 150 may be connected to the network 120 to communicate with one or more other components (e.g., the processing device 140, the terminal(s) 130, etc.) in the system 100. One or more components in the system 100 may access data or instructions stored in the storage device 150 via the network 120. In some embodiments, the storage device 150 may directly connect or communicate with one or more other components (e.g., the processing device 140, the terminal(s) 130, etc.) in the system 100. In some embodiments, the storage device 150 may be a portion of the processing device 140.

It should be noted that the description is merely provided for the purposes of illustration, and is not intended to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the ultrasonic device 110, the processing device 140, etc., may have their own storage modules. Alternatively, the storage device 150, etc., may be used as a common storage module. However, those variations and modifications do not depart the scope of the present disclosure.

Figure 2:
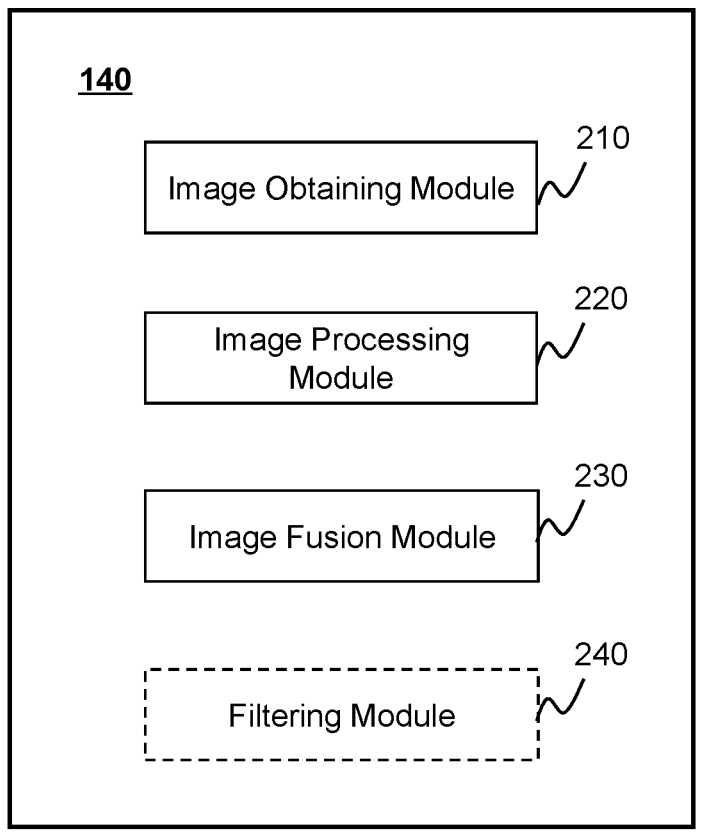
FIG. 2 is a block diagram illustrating an exemplary image enhancement system according to some embodiments of the present disclosure.

FIG. 2 is a block diagram illustrating an exemplary image enhancement system 200 according to some embodiments of the present disclosure.

As illustrated in FIG. 2, in some embodiments, the image enhancement system 200 may include an image obtaining module 210, an image processing module 220, and an image fusion module 230. In some embodiments, the image enhancement system 200 may be configured on a processing device (e.g., the processing device 140), so as to execute functions included in the modules of the image enhancement system 200.

In some embodiments, the image obtaining module 210 may be configured to obtain an initial image.

In some embodiments, the image processing module 220 may be configured to obtain a first image and a second image by performing speckle noise reduction and edge enhancement on the initial image, respectively. In some embodiments, the speckle noise reduction and the edge enhancement may be performed in parallel.

In some embodiments, the image processing module 220 may determine a structure tensor of the initial image, and perform the speckle noise reduction and the edge enhancement on the initial image based on the structure tensor, respectively.

In some embodiments, the image processing module 220 may determine a diffusion tensor of the initial image based on the structure tensor, and obtain the first image by performing the speckle noise reduction on the initial image based on the diffusion tensor.

In some embodiments, the image processing module 220 may determine an image mask and a direction map of the initial image based on the structure tensor, and obtain the second image by performing the edge enhancement on the initial image based on the image mask and the direction map.

In some embodiments, the image processing module 220 may determine at least one eigenvalue of the structure tensor; obtain an image edge region of the initial image by performing edge extraction on the initial image based on the at least one eigenvalue; and obtain the second image by performing the edge enhancement on the image edge region.

In some embodiments, the image processing module 220 may determine at least one eigenvalue of the structure tensor; obtaining at least one corrected eigenvalue by correcting the at least one eigenvalue; and performing the speckle noise reduction and/or the edge enhancement on the initial image based on the at least one corrected eigenvalue, respectively.

In some embodiments, the image fusion module 230 may be configured to determine a target image by performing a fusion operation on the first image and the second image.

In some embodiments, the image fusion module 230 may obtain a screened second image by screening the second image; and obtain the first fusion image by fusing the first image and the screened second image.

In some embodiments, the image fusion module 230 may obtain a first fusion image by performing a fusion operation on the first image and the second image; obtaining a second fusion image by performing a fusion operation on the first fusion image and the initial image; obtaining an updated second fusion image by iteratively updating the second fusion image; and determining the updated second fusion image as the target image. The iteratively updating the second fusion image may include designating the second fusion image as an updated initial image; and iteratively updating the second fusion image until an iteration termination condition is satisfied.

In some embodiments, the image enhancement system 200 may further include a filtering module 240. The filtering module 240 may be configured to perform a filtering operation on the initial image. In some embodiments, the filtering module 240 may perform the filtering operation on the initial image acquired by the image obtaining module 210, and then send the processed initial image to the image processing module 220 for the speckle noise reduction and/or the edge enhancement. In some embodiments, the filtering module 240 may be deleted.

Figure 3:
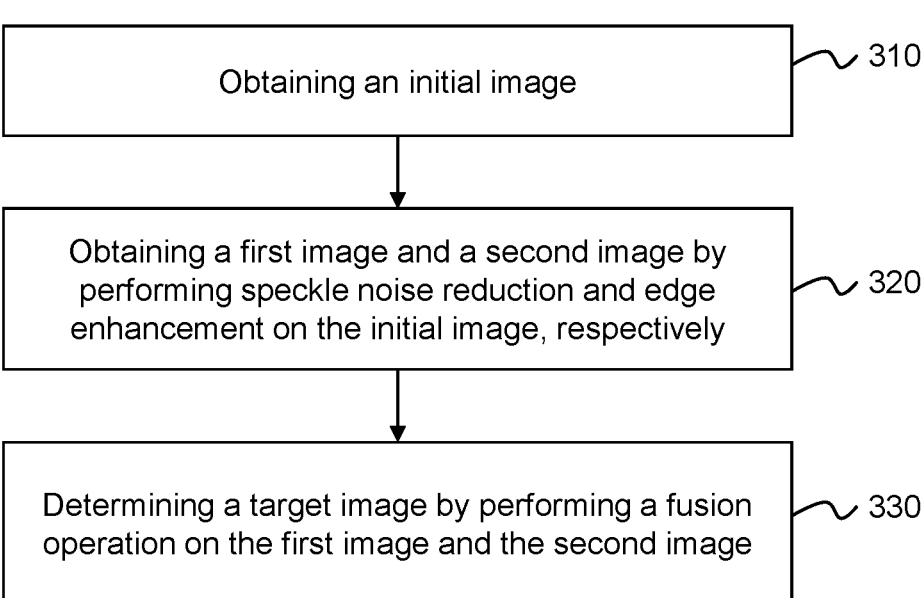
FIG. 3 is a flowchart illustrating an exemplary process for image enhancement according to some embodiments of the present disclosure.

FIG. 3 is a flowchart illustrating an exemplary process 300 for image enhancement according to some embodiments of the present disclosure.

As illustrated in FIG. 3, the process 300 may include one or more of the following operations. In some embodiments, the process 300 may be performed by a processing device (e.g., the processing device 140).

In 310, an initial image may be obtained. In some embodiments, operation 310 may be performed by the image obtaining module 210.

The initial image refers to an ultrasound image that needs to be enhanced, such as, a two-dimensional (2D) ultrasound image, a three-dimensional (3D) ultrasound image, etc. The ultrasound image may show image information of internal tissues of a subject to assist a doctor in disease diagnosis. Since noise(s) in an unprocessed ultrasound image (e.g., speckle noise (also referred to as speckle), etc.) may mask and reduce a portion of details in the ultrasound image, the quality of the ultrasound image may be reduced seriously. Therefore, a filtering operation, speckle noise reduction, edge enhancement, etc., may be performed on the ultrasound image to improve the quality of the ultrasound image.

In some embodiments, the processing device may obtain the initial image in various manners. In some embodiments, the processing device may acquire the initial image by scanning a target subject through an ultrasonic device. In some embodiments, the target subject may include an organism, a phantom, etc. For example, the target subject may include a specific portion of a human body, such as, the neck, the chest, the abdomen, or the like, or any combination thereof. As another example, the target subject may be a patient to be scanned by the ultrasonic device 110. In some embodiments, the target subject to be scanned may be subjected to ultrasound examination in any position, such as, at least one of a supine position, a lateral position, a prone position, a semi-recumbent position, or a sitting position. In some embodiments, the processing device may acquire the initial image of the target subject in other manners. For example, the processing device may acquire the initial image from a storage device (e.g., the storage device 150), generate a simulated image through a model, etc.

In 320, a first image and a second image may be obtained by performing speckle noise reduction and edge enhancement on the initial image, respectively. In some embodiments, operation 320 may be performed by the image processing module 220.

In some embodiments, the processing device may perform an enhancement operation on the acquired initial image. In some embodiments, the enhancement operation on the initial image may include at least one of the speckle noise reduction, the edge enhancement, or the like. In some embodiments, the speckle noise reduction and the edge enhancement may be performed separately on the initial image. In some embodiments, the processing device may designate the initial image that is processed using the speckle noise reduction as the first image. In some embodiments, the processing device may designate the initial image that is processed using the edge enhancement as the second image.

In some embodiments, before the speckle noise reduction and/or the edge enhancement are performed on the initial image, the processing device may filter the acquired initial image (e.g., a 3D Gaussian filtering, etc.) to obtain a filtered image corresponding to the initial image, and perform the speckle noise reduction and/or the edge enhancement on the filtered image, respectively. The processing device may designate the filtered image that is processed using the speckle noise reduction as the first image, and designate the filtered image that is processed using the edge enhancement as the second image.

According to some embodiments of the present disclosure, by filtering the initial image, the noise(s) in the initial image may be preliminarily reduced under the condition of retaining image details as much as possible, which improves the effectiveness and reliability of subsequent image processing and analysis.

In some embodiments, the speckle noise reduction and the edge enhancement may be performed in parallel, and the execution time of the speckle noise reduction and the edge enhancement may be partially or completely overlapped. In some embodiments, the speckle noise reduction and the edge enhancement may be performed successively, and the execution times of the speckle noise reduction and the edge enhancement may not overlap.

According to some embodiments of the present disclosure, by performing the speckle noise reduction and the edge enhancement in parallel, the calculations may be accelerated and repeated operations may be reduced, thereby effectively improving the efficiency of the ultrasound image processing.

In some embodiments, the processing device may respectively perform the speckle noise reduction and the edge enhancement on the initial image based on a structure tensor of the initial image.

The structure tensor may express spatial information of the ultrasound image, and may be used to distinguish a flat region, an edge region, and a corner region of the ultrasound image. In some embodiments, the structure tensor of the ultrasound image may be presented in a matrix form, represented by a local contour, a gradient direction, and a relative contrast between the local contour and the gradient direction. The relative contrast may represent a degree of change between the local contour and the gradient direction.

In some embodiments, the structure tensor may include at least one eigenvector, at least one eigenvalue, etc. An eigenvalue of the structure tensor may represent a degree of diffusion (i.e., a diffusion coefficient) of an image (e.g., the initial image) in a direction of an eigenvector. In some embodiments, the processing device may determine the structure tensor of the initial image based on a type of the initial image (e.g., the 2D image, the 3D image, etc.). For example, a structure tensor of a 2D initial image may be determined according to Equation (1). As another example, a structure tensor of a 3D initial image may be determined according to Equation (2).

In some embodiments, if the ultrasound image is a 2D image, the at least one eigenvector of the structure tensor may be a 2D eigenvector, and the at least one eigenvalue may include two eigenvalues corresponding to the 2D eigenvector. In some embodiments, if the ultrasound image is a 3D image, the at least one eigenvector of the structure tensor may be a 3D eigenvector, and the at least one eigenvalue may include three eigenvalues corresponding to the 3D eigenvector.

In some embodiments, a 2D ultrasound image coordinate system may be established with an image middle point (or other points) in the 2D ultrasound image, an x-axis direction may be a transverse direction in the 2D ultrasound image coordinate system, and a y-axis direction may be a longitudinal direction in the 2D ultrasound image coordinate system. The x-axis and the y-axis may be perpendicular to each other.

In some embodiments, the 2D eigenvector of the structure tensor may include a first eigenvector $w_1$ corresponding to the gradient direction and a second eigenvector $w_2$ corresponding to a contour direction. In some embodiments, the at least one eigenvalue of the structure tensor may include a first eigenvalue $\mu_1$ and a second eigenvalue $\mu_2$, which are used to represent diffusion amounts in the gradient direction and the contour direction, respectively. In some embodiments, the structure tensor of the 2D ultrasound image may be obtained based on the first eigenvector $w_1$, the second eigenvector $w_2$, the first eigenvalue $\mu_1$, and the second eigenvalue $\mu_2$.

In some embodiments, if the ultrasound image is a 2D image, the structure tensor may be determined according to the following equation:

$$J_\rho(I) = \begin{pmatrix} K_\rho * I_x^2 & K_\rho * (I_x I_y) \\ K_\rho * (I_x I_y) & K_\rho * I_y^2 \end{pmatrix} = (w_1 w_2)\begin{pmatrix} \mu_1 & 0 \\ 0 & \mu_2 \end{pmatrix}\begin{pmatrix} w_1^T \\ w_2^T \end{pmatrix}, \quad (1)$$

where I denotes an input image (e.g., the initial image acquired in operation 310), wherein I is a 2D image, $J_\rho(I)$ denotes a structure tensor matrix of the 2D input image I, $K_\rho$ denotes a Gaussian convolution kernel function with a variance $\rho$, * denotes the convolution, $I_x$ and $I_y$ denote image gradients along the x-axis and the y-axis, respectively, $w_1$ and $w_2$ denote the two eigenvectors of the structure tensor, $\mu_1$ and $\mu_2$ denote the two eigenvalues of the structure tensor, and T denotes a transpose operation.

In some embodiments, parameters in the Gaussian convolution kernel function $K_\rho$ may be set as empirical values, and may also be adjusted according to actual conditions.

In some embodiments, a 3D ultrasound image coordinate system may be established with an image middle point (or other points) in the 3D ultrasound image, an x-axis direction may be a horizontal direction in the 3D ultrasound image coordinate system, a y-axis direction may be a horizontal direction in the 3D ultrasound image coordinate system, and a z-axis direction may be a front-to-back direction in the 3D ultrasound image coordinate system. The x-axis, the y-axis, and the z-axis may be perpendicular to each other.

In some embodiments, the 3D eigenvector of the structure tensor may include a first eigenvector $w_1$, a second eigenvector $w_2$, and a third eigenvector $w_3$. The first eigenvector $w_1$ may correspond to the gradient direction, the third eigenvector $w_3$ may correspond to a contour direction, and the second eigenvector $w_2$ may correspond to a vector perpendicular to the directions of the first eigenvector $w_1$ and the third eigenvector $w_3$. In some embodiments, the eigenvalues of the structure tensor may include a first eigenvalue $\mu_1$, a second eigenvalue $\mu_2$, and a third eigenvalue $\mu_3$. The first eigenvalue $\mu_1$ may represent a diffusion amount in the gradient direction, the third eigenvalue $\mu_3$ may represent a diffusion amount in the contour direction, the second eigenvalue $\mu_2$ may represent a diffusion amount in a direction corresponding to the second eigenvector $w_2$. In some embodiments, the structure tensor of the 3D ultrasound image may be obtained based on the first eigenvector $w_1$, the second eigenvector $w_2$, the third eigenvector $w_3$, the first eigenvalue $\mu_1$, the second eigenvalue $\mu_2$, and the third eigenvalue $\mu_3$.

In some embodiments, if the ultrasound image is a 3D image, the structure tensor may be determined according to the following equation:

$$J_\rho'(\nabla I) = \nabla I \nabla I^T = \begin{bmatrix} I_x^2 & I_x I_y & I_x I_z \\ I_x I_y & I_y^2 & I_y I_z \\ I_x I_y & I_y I_z & I_z^2 \end{bmatrix} = [w_1 w_2 w_3] \begin{bmatrix} \mu_1 & 0 & 0 \\ 0 & \mu_2 & 0 \\ 0 & 0 & \mu_3 \end{bmatrix} \begin{bmatrix} w_1^T \\ w_2^T \\ w_3^T \end{bmatrix}, \quad (2)$$

where I denotes an input image (e.g., the initial image acquired in operation 310), wherein I is a 3D image, $J_\rho'(\nabla I)$ denotes a structure tensor matrix of the 3D input image I, $\nabla I$ denotes a determination of a gradient of the input image I, $I_x$, $I_y$, and $I_z$ denote gradient matrices along the x-axis, the y-axis, and the z-axis, respectively, $w_1$, $w_2$, and $w_3$ denote the three eigenvectors of the structure tensor, $\mu_1$, $\mu_2$, and $\mu_3$ denote the three eigenvalues of the structure tensor, and T denotes the transpose operation.

In some embodiments, the at least one eigenvalue and the at least one eigenvector of the structure tensor may be obtained by performing feature decomposition of the structure tensor matrix. In some embodiments, the at least one eigenvalue and the at least one eigenvector of the structure tensor may be determined through an algorithm, such as, an inverse power iteration algorithm, a Sturm sequence algorithm, a reverse iteration algorithm, a synchronous iteration algorithm, etc.

In some embodiments, the at least one eigenvector and the at least one eigenvalue of the structural tensor may be represented by a matrix. Each pixel in the ultrasound image may correspond to a value in the matrix. That is, a dimension of the matrix corresponding to the at least one eigenvector and the at least one eigenvalue may be consistent with a dimension of the ultrasound image.

In some embodiments, the structure tensor may be derived through a nonlinear anisotropic diffusion model. The anisotropic diffusion model may represent a change rate of a gray value of the ultrasound image at a time t (e.g., at any time).

In some embodiments, if the ultrasound image is a 2D image, the nonlinear anisotropic diffusion model may be represented according to a following equation:

$$\frac{\partial I(x, y, t)}{\partial t} = div[D \nabla I]. \quad (3)$$

If the ultrasound image is a 3D image, the nonlinear anisotropic diffusion model may be represented according to a following equation:

$$\frac{\partial I(x, y, z, t)}{\partial t} = div[D \nabla I], \quad (4)$$

where D denotes a diffusion tensor representing the diffusion amounts in the gradient direction and the contour direction, I denotes an input image (e.g., the initial image acquired in operation 310), $\nabla I$ denotes a determination of a gradient of the input image I, div denotes a divergence (i.e., a vector operator that may map a vector field in a vector space to a scalar field), ö denotes a derivative symbol, I(x, y, t) denotes an ultrasound image corresponding to a pixel point (x, y) at a time t, and I(x, y, z, t) denotes an ultrasound image corresponding to a pixel point (x, y, z) at a time t. The diffusion tensor D may be determined based on the structure tensor.

In some embodiments, the processing device may perform the speckle noise reduction and the edge enhancement on the initial image based on the structure tensor, respectively.

In some embodiments, the processing device may determine the diffusion tensor of the initial image based on the structure tensor, and perform the speckle noise reduction on the initial image based on the diffusion tensor to obtain the first image. More descriptions regarding the performing the speckle noise reduction on the initial image based on the diffusion tensor may be found in elsewhere in the present disclosure (e.g., FIG. 4 and the descriptions thereof), which is not repeated herein.

In some embodiments, the processing device may determine an image mask and a direction map of the initial image based on the structure tensor, and perform the edge enhancement on the initial image based on the image mask and the direction map to obtain the second image. More descriptions regarding the performing the edge enhancement on the initial image based on the image mask and the direction map may be found in elsewhere in the present disclosure (e.g., FIG. 5 and the descriptions thereof), which is not repeated herein.

In some embodiments, the processing device may determine the at least one eigenvalue of the structure tensor based on the structure tensor, obtain an image edge region of the initial image by performing edge extraction on the initial image based on the at least one eigenvalue, and perform the edge enhancement on the image edge region to obtain the second image. More descriptions regarding the performing the edge extraction on the initial image and performing the edge enhancement on the image edge region may be found in elsewhere in the present disclosure (e.g., FIG. 6 and the descriptions thereof), which is not repeated herein.

In some embodiments, the processing device may determine the at least one eigenvalue of the structure tensor based on the structure tensor, obtain at least one corrected eigenvalue by correcting the at least one eigenvalue, and perform the speckle noise reduction and/or the edge enhancement on the initial image based on the at least one corrected eigenvalue, respectively, to obtain the first image and/or the second image. More descriptions regarding the performing the speckle noise reduction and/or the edge enhancement on the initial image based on the at least one corrected eigenvalue may be found in elsewhere in the present disclosure (e.g., FIG. 7 and the descriptions thereof), which is not repeated herein.

According to some embodiments of the present description, by performing the speckle noise reduction and the edge enhancement on the ultrasound image based on the structure tensor, respectively, the speckle noise reduction and the edge enhancement may be performed according to the same parameters, which may be suitable for 2D and 3D images simultaneously, thereby simplifying and unifying the image enhancement process, and improving the applicability and flexibility of the image enhancement.

In 330, a target image may be determined by performing a fusion operation on the first image and the second image. In some embodiments, operation 330 may be performed by the image fusion module 230.

The target image may refer to an ultrasound image that is obtained by performing the image enhancement on the initial image and meets user requirement(s). For example, the target image may be an image in which the speckle noise(s) in the initial image are reduced or even eliminated after the speckle noise reduction is performed on the initial image, and/or an image in which the definition of the structure edge in the initial image is enhanced after the edge enhancement is performed on the initial image, etc. In some embodiments, the processing device may perform the fusion operation on the first image that is obtained by performing the speckle noise reduction on the initial image and the second image that is obtained by performing the edge enhancement on the initial image, and designate the fusion image as the target image. The generated fusion image may significantly improve image quality, and effectively avoid introducing too much noise(s). In some embodiments, corresponding to the initial image, the target image may also include a 2D ultrasound image, a 3D ultrasound image, etc.

Merely by way of example, FIGS. 10A and 10B are schematic diagrams illustrating an exemplary initial two-dimensional ultrasound image and an exemplary enhanced two-dimensional ultrasound image according to some embodiments of the present disclosure. FIG. 10A shows an initial 2D ultrasound image generated without image enhancement (i.e., the initial image), and FIG. 10B shows a 2D ultrasound image generated by performing the image enhancement (i.e., the target image) according to the image enhancement process provided by some embodiments of the present disclosure. Comparing a portion of FIG. 10A corresponding to a solid frame 1010 and a portion of FIG. 10B corresponding to a solid frame 1040, the edge enhancement improves the contrast of the edge region in the 2D ultrasound image. Comparing a portion of FIG. 10A corresponding to a solid frame 1020 and a portion of FIG. 10B corresponding to a solid frame 1050, and a portion of FIG. 10A corresponding to a solid frame 1030 and a portion of FIG. 10B corresponding to a solid frame 1060, the speckle noise reduction can improve the image quality of the uniform region in the 2D ultrasound image, which means the speckle noise reduction can improve the definition of the 2D ultrasound image, and make the 2D ultrasound image convenient for the doctor to diagnose.

Merely by way of example, FIG. 11 is a schematic diagram illustrating an exemplary initial three-dimensional ultrasound image and an exemplary enhanced three-dimensional ultrasound image according to some embodiments of the present disclosure. An image 1110 may be an initial 3D ultrasound image (i.e., the initial image), and an image 1120 may be a 3D ultrasound image generated by performing the image enhancement (i.e., the target image) according to the image enhancement process provided by some embodiments of the present disclosure. It may be seen that by using the image enhancement process in the present disclosure, the 3D ultrasound image becomes smoother, the speckle noise can be eliminated, and detailed information in the initial 3D ultrasound image can be still preserved.

In some embodiments, the processing device may screen the second image to obtain a screened second image, fuse the first image and the screened second image to obtain a fusion image, and designate the fusion image as the target image. More descriptions regarding the screening of the second image and the fusing of the first image and the screened second image may be found in elsewhere in the present disclosure (e.g., FIG. 8 and the descriptions thereof), which is not repeated herein.

In some embodiments, the processing device may perform an iterative fusion on the first image and the second image, and designate a fusion image satisfying an iteration termination condition as the target image. More descriptions regarding the performing the iterative fusion on the first image and the second image may be found in elsewhere in the present disclosure (e.g., FIG. 9 and the descriptions thereof), which is not repeated herein.

Figure 4:
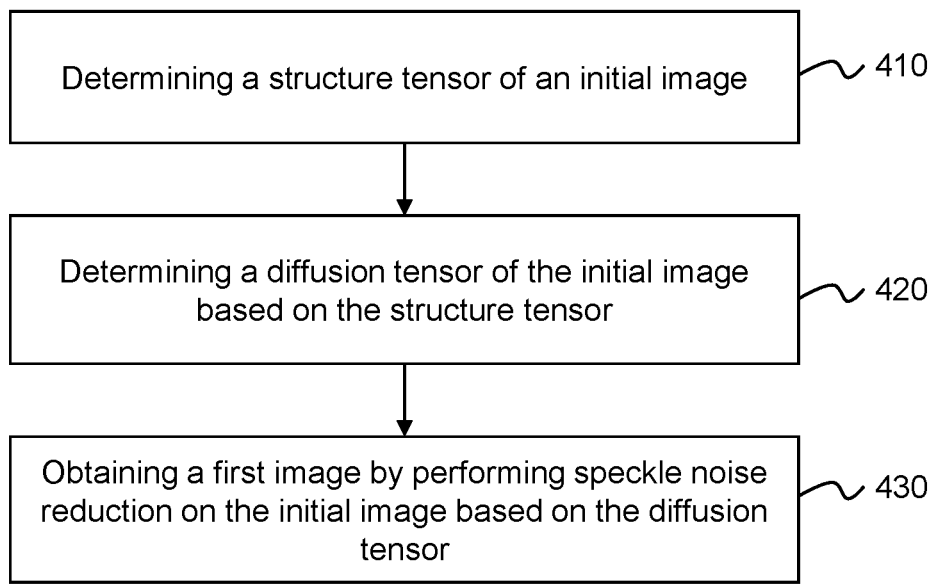
FIG. 4 is a flowchart illustrating an exemplary process for image enhancement according to some embodiments of the present disclosure.

FIG. 4 is a flowchart illustrating an exemplary process 400 for image enhancement according to some embodiments of the present disclosure.

As illustrated in FIG. 4, the process 400 may include one or more of the following operations. In some embodiments, the obtaining the first image by performing the speckle noise reduction on the initial image in operation 320 may be implemented by executing the process 400. In some embodiments, the process 400 may be performed by a processing device (e.g., the processing device 140) or the image processing module 220.

In 410, a structure tensor of the initial image may be determined. More descriptions regarding the determination of the structure tensor of the initial image may be found in elsewhere in the present disclosure (e.g., operation 320 and the descriptions thereof), which is not repeated herein.

In 420, a diffusion tensor of the initial image may be determined based on the structure tensor.

The diffusion tensor of an ultrasound image may represent diffusion amounts in gradient and contour directions. In some embodiments, the processing device may determine the diffusion tensor of the initial image based on at least one eigenvalue of the structure tensor of the initial image.

In some embodiments, the processing device may determine at least one eigenvector and the at least one eigenvalue of the structure tensor. For example, if the structure tensor has been determined, the at least one eigenvector and the at least one eigenvalue of the structure tensor may be obtained according to Equation (1) or Equation (2). For a 2D ultrasound image, the at least one eigenvector may include a first eigenvector $w_1$ and a second eigenvector $w_2$, and the at least one eigenvalue may include a first eigenvalue $\mu_1$ and a second eigenvalue $\mu_2$. For a 3D ultrasound image, the at least one eigenvector may include a first eigenvector $w_1$, a second eigenvector $w_2$, and a third eigenvector $w_3$, and the at least one eigenvalue may include a first eigenvalue $\mu_1$, a second eigenvalue $\mu_2$, and a third eigenvalue $\mu_3$.

In some embodiments, the processing device may correct the at least one eigenvalue of the obtained structure tensor. For example, for the 2D ultrasound image, the first eigenvalue $\mu_1$ and the second eigenvalue $\mu_2$ may be corrected to obtain a corrected first eigenvalue $\lambda_1$ and a corrected second eigenvalue $\lambda_2$. For the 3D ultrasound image, the first eigenvalue $\mu_1$, the second eigenvalue $\mu_2$, and the third eigenvalue $\mu_3$ may be corrected to obtain a corrected first eigenvalue $\lambda_1$, a corrected second eigenvalue $\lambda_2$, and a corrected third eigenvalue $\lambda_3$.

Since anisotropic diffusion can be used to perform speckle noise reduction on the ultrasound image while retaining edge information of the ultrasound image, in order to perform the image enhancement on an image edge during the diffusion process, the processing device may correct the at least one eigenvalue of the structure tensor according to situations.

In some embodiments, the processing device may correct the at least one eigenvalue of the structure tensor through a following manner. The at least one corrected eigenvalue may be obtained by correcting the at least one eigenvalue in a homogeneous tissue region and an edge region in the initial image. As used herein, the 2D ultrasound image may correspond to two eigenvalues, and the 3D ultrasound image may correspond to three eigenvalues.

In some embodiments, the processing device may make a difference between the two corrected eigenvalues or the three corrected eigenvalues in the homogeneous tissue region be less than or equal to a first preset threshold. That is, the corrected eigenvalues may be nearly equal in the homogeneous tissue region of the initial image, which represents that speeds and forms of diffusion along different directions in the homogeneous tissue region are equal or approximately equal. The first preset threshold may be an empirical value or determined according to specific requirements.

In some embodiments, in a heterogeneous tissue region, values of the corrected eigenvalues may be reduced. In the heterogeneous tissue region (e.g., the edge region) of the ultrasound image, the edge information needs to be enhanced, and the at least one eigenvalue corresponding to the portion of the heterogeneous tissue region may be reduced (i.e., be smaller than the at least one eigenvalue in the homogeneous tissue region) to avoid being smoothed.

In some embodiments, the processing device may terminate the diffusion of a maximum eigenvalue among the two corrected eigenvalues or the three corrected eigenvalues in the edge region. That is, no diffusion may be performed along a direction of the eigenvector corresponding to the maximum eigenvalue. In some embodiments, whether the diffusion of the maximum eigenvalue is terminated may be determined by whether the maximum eigenvalue is close to zero. The smaller the maximum eigenvalue is, the closer the maximum eigenvalue is to zero, indicating the closer it is to the termination of the diffusion. In some embodiments, if the maximum eigenvalue is less than or equal to a preset threshold, it may be considered that the diffusion of the maximum eigenvalue needs to be terminated. The preset threshold may be a value close to zero, which may be an empirical value or determined according to user requirement(s).

In some embodiments, there may be an obvious transition between the homogeneous tissue region and the heterogeneous tissue region of the ultrasound image, which may facilitate the doctor to check the specific situation by enhancing the contrast. In some embodiments, the processing device may determine whether the at least one eigenvalue corresponds to the homogeneous tissue region or the heterogeneous tissue region according to the difference between the eigenvalues (e.g., two eigenvalues for the 2D image, and three eigenvalues for the 3D image). For example, for the 2D ultrasound image, each pixel of the 2D ultrasound image may correspond to a first eigenvalue $\mu_1$ and a second eigenvalue $\mu_2$. By determining a difference between the first eigenvalue $\mu_1$ and the second eigenvalue $\mu_2$ corresponding to each pixel, and determining whether the difference exceeds the preset threshold, whether the at least one eigenvalue corresponds to the homogeneous tissue region or the heterogeneous tissue region may be determined.

In some embodiments, for the 2D image, the two corrected eigenvalues may be determined according to following equations:

$$C = (\mu_1 - \mu_2)^2, \tag{5}$$

$$\lambda_1 = \alpha, \tag{6}$$

$$\lambda_2 = \begin{cases} \alpha, & C = 0 \\ \alpha + (1 - \alpha)\exp\left(-\dfrac{K}{C}\right), & C \neq 0 \end{cases} \tag{7}$$

where $\alpha$ denotes a set constant with a relatively small value (e.g., in some embodiments, $\alpha$ may be set to 0.01), K denotes a threshold constant customized according to actual situations, $\mu_1$ and $\mu_2$ denote the two eigenvalues of the structure tensor, $\lambda_1$ denotes a corrected value of the first eigenvalue $\mu_1$, $\lambda_2$ denotes a corrected value of the second eigenvalue $\mu_2$, exp denotes the exponential function, and C denotes an intermediate coefficient representing a relationship between the first eigenvalue $\mu_1$ and the second eigenvalue $\mu_2$. According to the above equations (5)-(7), if the first eigenvalue $\mu_1$ is equal to the second eigenvalue $\mu_2$, values of the corrected first eigenvalue $\lambda_1$ and the corrected second eigenvalue $\lambda_2$ may be the constant $\alpha$. If the first eigenvalue $\mu_1$ is not equal to the second eigenvalue $\mu_2$, the value of the corrected first eigenvalue $\lambda_1$ may be the constant $\alpha$, and the value of the corrected second eigenvalue $\lambda_2$ may be determined according to Equation (7).

In some embodiments, for the 3D image, the three corrected eigenvalues may be determined according to following equations:

$$C = (\mu_1 - \mu_3)^2, \tag{8}$$

$$\lambda_1 = c_1, \tag{9}$$

$$\lambda_2 = c_2, \tag{10}$$

$$\lambda_3 = \begin{cases} \alpha\left(1 - \dfrac{C}{K}\right), & C \leq K \\ \beta\left(\exp\left(1 - \dfrac{C}{K}\right) - 1\right), & C > K \end{cases} \tag{11}$$

where C denotes a square of the difference between the maximum value and the minimum value among the three eigenvalues $\mu_1$, $\mu_2$, and $\mu_3$ of the structure tensor, wherein $\mu_1 \geq \mu_2 \geq \mu_3$; $\lambda_1$ denotes a corrected value of the first eigenvalue $\mu_1$, $\lambda_2$ denotes a corrected value of the second eigenvalue $\mu_2$, $\lambda_3$ denotes a corrected value of the second eigenvalue $\mu_3$, $\alpha$ denotes a constant that can be used to determine the diffusion amount (e.g., a may be set to 1), $\beta$ denotes a negative number that can be used to determine an amount of the edge enhancement, an absolute value of $\beta$ may determine the amount of edge enhancement (e.g., the larger the absolute value, the more blurred the edge, a value of $\beta$ may be within a range of [−1, −0.1]), and K and $c_1$ are constants, which may be set by the user (e.g., the larger the value of K, the more blurred the tissue, a value of $c_1$ may be within a range of [0, 0.5]). In some embodiments, the determined eigenvalues $\lambda_1$, $\lambda_2$, and $\lambda_3$ may represent diffusion coefficients of the image that diffuse along three directions of the three eigenvectors, respectively. In some embodiments, the value of C may be small in the homogeneous tissue region, at which time the diffusion coefficients along the three directions may be approximately equal. In some embodiments, the diffusion coefficients may indicate terminating the diffusion of the image and even enhancing the edge in the edge region. If the diffusion coefficients indicate terminating the diffusion, the eigenvalue $\lambda_3$ may be zero or approximately zero. If the diffusion coefficients indicates enhancing the edge, the eigenvalue $\lambda_3$ may be a negative number.

In some embodiments, by displaying corresponding adjustable parameters on a user interface, the processing device may adjust the at least one eigenvalue according to an input of the adjustment parameters set by the user.

According to some embodiments of the present disclosure, after the at least one eigenvalue and the at least one eigenvector of the structural tensor are obtained, the at least one eigenvalue may be corrected according to different features of the homogeneous tissue region and the edge region, which improves a consistency between the corrected eigenvalues and the features of the image, thereby improving the accuracy of the anisotropic diffusion information determined according to the corrected eigenvalues.

In some embodiments, the processing device may determine the diffusion tensor based on the at least one eigenvector and the at least one corrected eigenvalue.

In some embodiments, for the 2D image, the diffusion tensor may be determined according to a following equation:

$$D(I) = (w_1 w_2)\begin{pmatrix} \lambda_1 & 0 \\ 0 & \lambda_2 \end{pmatrix}\begin{pmatrix} w_1^T \\ w_2^T \end{pmatrix}, \tag{12}$$

where D(I) denotes the diffusion tensor of the input image I (e.g., the initial image obtained in operation 310), wherein the input image I is a 2D image, $w_1$ and $w_2$ denote the two eigenvectors of the structure tensor, $\lambda_1$ and $\lambda_2$ denote the two corrected eigenvalues of the structure tensor, and T denotes the transpose operation.

In some embodiments, for the 3D image, the diffusion tensor may be determined according to a following equation:

$$D'(I) = [w_1 w_2 w_3]\begin{bmatrix} \lambda_1 & 0 & 0 \\ 0 & \lambda_2 & 0 \\ 0 & 0 & \lambda_3 \end{bmatrix}\begin{bmatrix} w_1^T \\ w_2^T \\ w_3^T \end{bmatrix}, \tag{13}$$

where D'(I) denotes the diffusion tensor of the input image I (e.g., the initial image obtained in operation 310), wherein the input image I is a 3D image, $w_1$, $w_2$, and $w_3$ denote the three eigenvectors of the structure tensor, $\lambda_1$, $\lambda_2$, and $\lambda_3$ denote the three corrected eigenvalues of the structure tensor, and T denotes the transpose operation.

In 430, the first image may be obtained by performing the speckle noise reduction on the initial image based on the diffusion tensor.

In some embodiments, the processing device may use the diffusion tensor as a direction-selective diffusion factor to act on the ultrasound image, perform the speckle noise reduction on the initial image, and designate the initial image performed the speckle noise reduction as the first image. By performing the speckle noise reduction on the ultrasound image, the noise(s) (e.g., the speckle noise) in the ultrasound image may be reduced, and the quality of the ultrasound image may be improved.

In some embodiments, the processing device may obtain the anisotropic diffusion information of the initial image based on the diffusion tensor and an image gradient of the initial image. The anisotropic diffusion information may represent a change rate of a gray value of the initial image at a certain time point.

In some embodiments, the image gradient of the diffusion tensor and initial image may be substituted into an equation (i.e., Equation (3) or Equation (4)) of a nonlinear anisotropic diffusion model, thereby obtaining the anisotropic diffusion information of the initial image.

In some embodiments, for the 2D image, the anisotropic diffusion information of the initial image may be determined according to a following equation:

$$\partial I_t = div[D\nabla I] = div\begin{bmatrix} D_{11}\partial_x I + D_{12}\partial_y I \\ D_{21}\partial_x I + D_{22}\partial_y I \end{bmatrix}, \tag{14}$$

where $\partial I_t$ denotes the anisotropic diffusion information, $\nabla I$ and div denote same meanings as those in Equation (3), I denotes the input image (e.g., the initial image obtained in operation 310), wherein the input image I is a 2D image, D denotes the diffusion tensor, wherein D may be represented by a matrix $$\left(e.g., D = \begin{bmatrix} D_{11} & D_{12} \\ D_{21} & D_{22} \end{bmatrix}\right),$$

and $\partial_x$ and $\partial_y$ denote diffusion information of the input image I in the x and y directions, respectively.

In some embodiments, for the 3D image, the anisotropic diffusion information of the initial image may be determined according to a following equation:

$$\partial I_t = div[D\nabla I] = div\begin{bmatrix} D_{11}\partial_x I + D_{12}\partial_y I + D_{13}\partial_z I \\ D_{21}\partial_x I + D_{22}\partial_y I + D_{31}\partial_z I \\ D_{31}\partial_x I + D_{32}\partial_y I + D_{33}\partial_z I \end{bmatrix}, \tag{15}$$

where $\partial I_t$ denotes the anisotropic diffusion information, $\nabla_I$ and div denote same meanings as those in Equation (4), I denotes the input image (e.g., the initial image obtained in operation 310), wherein the input image I is a 3D image, D denotes the diffusion tensor, wherein D may be represented by a matrix $$\left(e.g., D = \begin{bmatrix} D_{11} & D_{12} & D_{13} \\ D_{21} & D_{22} & D_{23} \\ D_{31} & D_{32} & D_{33} \end{bmatrix}\right),$$

and $\partial_x$, $\partial_y$, and $\partial_z$ denote diffusion information of the input image I in x, y, and z directions, respectively.

In some embodiments, the processing device may perform the speckle noise reduction on the initial image based on the anisotropic diffusion information to obtain the first image. For instance, the processing device may add an increment of the anisotropic diffusion information over time to the initial image to obtain an image of speckle noise reduction (i.e., the first image).

In some embodiments, the image generated by performing the speckle noise reduction may be obtained according to a following equation:

$$I^* = I + \partial I_t \cdot d_t,  \qquad (16)$$

where I denotes the input image (e.g., the initial image obtained in operation 310), I* denotes the image generated by performing the speckle noise reduction, and $\partial I_t \cdot d_t$ denotes the increment of the anisotropic diffusion information over time.

According to some embodiments of the present disclosure, the anisotropic diffusion information may be obtained based on the diffusion tensor and the image gradient of the initial image, and the speckle noise reduction may be further performed on the initial image based on the anisotropic diffusion information, so that the image edge may be enhanced to a certain extent while preserving image details.

Figure 5:
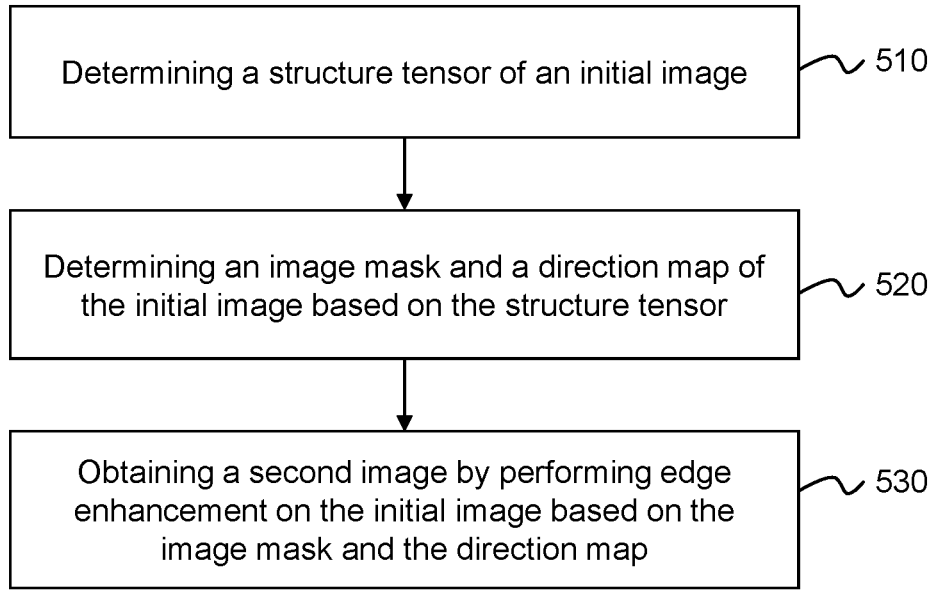
FIG. 5 is a flowchart illustrating an exemplary process for image enhancement according to some embodiments of the present disclosure.

FIG. 5 is a flowchart illustrating an exemplary process 500 for image enhancement according to some embodiments of the present disclosure.

As illustrated in FIG. 5, the process 500 may include one or more of the following operations. In some embodiments, the obtaining the second image by performing the edge enhancement on the initial image in operation 320 may be implemented according to the process 500. In some embodiments, the process 500 may be performed by a processing device (e.g., the processing device 140) or the image processing module 220.

In 510, a structure tensor of the initial image may be determined. More descriptions regarding the determination of the structure tensor of the initial image may be found in elsewhere in the present disclosure (e.g., operation 320 and the descriptions thereof), which is not repeated herein.

In 520, an image mask and a direction map of the initial image may be determined based on the structure tensor.

The image mask may represent edge information of one or more areas of interest (ROI) (e.g., organs, tissues, etc.) in the ultrasound image. The image mask may be a binary image. In some embodiments, the image mask may be a binary image with a same dimension as the ultrasound image. The image mask may be represented by a matrix, and the matrix may include two values of 0 and 1. Pixels with 0 may represent a homogeneous tissue region, which does not need to be processed, and Pixels with 1 may represent a heterogeneous tissue region (i.e., an edge region), which needs to be enhanced. In some embodiments, accurately filtered ROI(s) may be obtained through the image mask. Therefore, a portion of unnecessary edge information may be filtered, and unnecessary calculation amounts may be avoided, which improves the calculation accuracy and the filtering efficiency. For the ultrasound image, since a frame rate of the image is relatively high (e.g., a frame rate of a cardiac ultrasound image may reach 100 frames or more), the efficiency of image masks may be significantly improved.

In some embodiments, the processing device may determine at least one eigenvalue of the structure tensor, and determine the image mask of the initial image based on the at least one eigenvalue of the structure tensor.

For each pixel in the ultrasound image, if a difference between two eigenvalues of the pixel (e.g., two eigenvalues of the pixel in a 2D image, a maximum eigenvalue and a minimum eigenvalue of the pixel in a 3D image) is relatively large (e.g., larger than a certain threshold), it may be considered that the pixel is located in the edge region of the image to some extent. However, in the homogeneous tissue region where the speckle noise has a relatively high level, pixels may have isotropic properties. Therefore, if the difference between the two eigenvalues is relatively small, the pixel may be considered to have the speckle noise. In some embodiments, the processing device may obtain mask information of the image by setting a threshold or automatically determining the threshold.

In some embodiments, for each pixel point in the ultrasound image, if the difference between the maximum value and the minimum value in a plurality of eigenvalues is greater than a threshold, the processing device may determine that the pixel point belongs to the heterogeneous tissue region (i.e., the edge region), and designate the pixel value of the pixel as 1. If the difference is less than or equal to the threshold, the processing device may determine that the pixel belongs to the homogeneous tissue region, and designate the pixel value of the pixel as 0. In some embodiments, the threshold of the difference between the two eigenvalues may be determined according to a mean value of the difference between the two eigenvalues. That is, the mean value of the difference between the two eigenvalues of a portion of or all pixels in the image may be determined as the threshold. In some embodiments, the threshold may be set according to experience(s), and may also be adjusted according to actual condition(s).

In some embodiments, for the 2D image, the mask image may be determined according to the following equation:

$$M(x, y) = \begin{cases} 1, & \|\mu_1(x, y)\| - \|\mu_2(x, y)\| > \\ & \frac{1}{m \times n}\left(\sum_{i=1}^{m}\sum_{j=1}^{n}\|\mu_1(i, j)\| - \|\mu_2(i, j)\|\right), \\ 0, & \text{otherwise} \end{cases} \quad (17)$$

where M(x, y) denotes edge information at a pixel point (x, y), $\mu_1(x, y)$ denotes a first eigenvalue $\mu_1$ corresponding to the pixel point (x, y), $\mu_2(x, y)$ denotes a second eigenvalue $\mu_2$ corresponding to the pixel point (x, y), the first eigenvalue $\mu_1$ and the second eigenvalue $\mu_2$ are eigenvalue data in the structural tensor, n and m denote a length and a width of the image, and i and j denote variables of a summation function.

In some embodiments, the difference between the two eigenvalues may be an absolute value of a difference between absolute values of the two eigenvalues. For example, as shown in Equation (17), the difference between the first eigenvalue $\mu_1(x, y)$ and the second eigenvalue $\mu_2(x, y)$ may be $\|\mu_1(x,y)\| - \|\mu_2(x,y)\|$. In some embodiments, the threshold may be determined by taking a mean value of the difference between the two eigenvalues corresponding to each pixel in the ultrasound image. For example, as shown in Equation (17), $$\frac{1}{m \times n}\left(\sum_{i=1}^{m}\sum_{j=1}^{n}\|\mu_1(i, j)\| - \|\mu_2(i, j)\|\right)$$

may be designated as the threshold.

In some embodiments, for the 3D image, the mask image may be determined according to the following equation:

$$M'(x, y, z) = \begin{cases} 1, & \|\mu_1(x, y, z)\| - |\mu_2(x, y, z)\| > \dfrac{1}{l \times m \times n} \\ & \left( \sum_{i=1}^{l} \sum_{j=1}^{m} \sum_{k=1}^{n} \|\mu_1(i, j, k)| - |\mu_2(i, j, k)\| \right), \\ 0, & \text{otherwise} \end{cases} \quad (18)$$

where M'(x, y, z) denotes edge information at a pixel point (x, y, z), $\mu_1$(x, y, z) denotes a first eigenvalue $\mu_1$ corresponding to the pixel point (x, y, z), $\mu_2$ (x, y, z) denotes a second eigenvalue $\mu_2$ corresponding to the pixel point (x, y, z), the first eigenvalue $\mu_1$ and the second eigenvalue $\mu_2$ are eigenvalue data in the structural tensor (as used herein, one of the first eigenvalue $\mu_1$ and the second eigenvalue $\mu_2$ is the maximum eigenvalue corresponding to the pixel point (x, y, z), and the other one of the first eigenvalue $\mu_1$ and the second eigenvalue $\mu_2$ is the minimum eigenvalue corresponding to the pixel point (x, y, z)), l, m, and n denote a length, a width, and a height of the image, and i, j, and k denote variables of a summation function. $\|\mu_1(x,y,z)|-|\mu_2(x,y,z)\|$ may be a difference between the first eigenvalue $\mu_1$(x, y, z) and the second eigenvalue $\mu_2$(x, y, z).)

$$\frac{1}{l \times m \times n} \left( \sum_{i=1}^{l} \sum_{j=1}^{m} \sum_{k=1}^{n} \|\mu_1(i, j, k)| - |\mu_2(i, j, k)\| \right)$$

may be the threshold for the difference between the two eigenvalues.

According to some embodiments of the present disclosure, the image mask of the ultrasound image may be determined according to the at least one eigenvalue of the structure tensor, which is different from the normal determination through a standard deviation algorithm, etc., which significantly reduces the calculation amount of the image processing.

The direction map of the ultrasound image may be used to represent direction information of each pixel in the image. In some embodiments, the processing device may determine at least one eigenvector of the structure tensor, and determine the direction map based on the at least one eigenvector of the structure tensor.

In some embodiments, the processing device may use a first eigenvector $w_1$ and a second eigenvector $w_2$ to represent directions of maximum and minimum changes of the eigenvalues of each pixel point, respectively, and obtain the direction information of each pixel point using arc tangent, thereby determining the direction map of the ultrasound image.

In some embodiments, for the 2D image, the direction map may be determined according to the following equation:

$$O(x, y) = G(n, \sigma) * \text{cor}\left( \arctan\left( \frac{w_1}{w_2} \right) \right), \quad (19)$$

where O(x, y) denotes direction information at a pixel point (x, y) (as used herein, a direction of the pixel point may be represented by an angle, and an angle range may be within a range of [0, π]), cor( ) denotes a direction correction function, G(n, σ) denotes a Gaussian filter kernel with a dimension n and a standard deviation σ, * denotes the convolution, and $w_1$ and $w_2$ denote two eigenvectors of the structure tensor.

In some embodiments, for the 3D image, the direction map may be determined according to the following equation:

$$O(x, y, z) = \\ G(n, \sigma) * \left[ \text{cor}\left( \arctan\left( \frac{w_1}{w_2} \right) \right), \text{cor}\left( \arctan\left( \frac{w_2}{w_3} \right) \right), \text{cor}\left( \arctan\left( \frac{w_1}{w_3} \right) \right) \right], \quad (20)$$

where O(x, y, z) denotes direction information at a pixel point (x, y, z), $w_1$, $w_2$, and $w_3$ denote three eigenvectors of the structure tensor, and other symbols denote similar meanings to those in Equation (19), which is not repeated herein.

The obtained direction information (e.g., O(x, y)) needs to be corrected to obtain an accurate direction map. In some embodiments, as shown in Equations (19) and (20), the processing device may correct the direction information by using the directional correction function. In some embodiments, the direction correction function $$\left( \text{e.g., cor}\left( \arctan\left( \frac{W1}{W2} \right) \right) \right)$$

may be used to determine the angle range through the arc tangent. However, an angle range determined by an arc tangent equation $$\left( \text{e.g., } \arctan\left( \frac{W1}{W2} \right) \right)$$

may not fall within the angle range [0, π], and an angle in the angle range determined by the arc tangent equation may be a negative number. Therefore, the direction correction function may be used to perform the direction correction, to cause final direction information to fall within the angle range [0, π]. In some embodiments, parameters in the direction correction function may be set according to empirical values, and may also be adjusted according to specific conditions.

In some embodiments, in order to reduce the interference of noise pixels in a real ultrasound image, the processing device may further filter the obtained direction map. In some embodiments, the processing device may divide the direction map into blocks, and designate a certain statistical feature of direction data within the blocks as a block direction. In some embodiments, parameters in the Gaussian filter kernel G(n, σ) may be set according to empirical values, and may also be adjusted according to specific situations.

In some embodiments, the direction correction function may be used to divide the angle range [0, π] into a plurality of angle intervals. For each of the plurality of angle intervals, one value within the angle interval may be designated as a value of the angle interval. In some embodiments, a count of Gaussian filter kernels may be consistent with a count of angle intervals. For each angle interval, a corresponding database may be generated for information in the angle interval, so the Gaussian filter kernels may perform the filtering operation according to the database corresponding to the angle interval.

In some embodiments, if the angle interval is relatively large, the count of the angle interval may be relatively small, the count of the corresponding Gaussian filter kernels may be relatively small, and the calculation efficiency may be relatively high. If the angle interval is relatively small, the count of angle intervals may be relatively large, the count of the corresponding Gaussian filter kernels may be relatively large, and the calculation accuracy may be relatively high. Therefore, a selection of the angle interval may require a balance between the calculation efficiency and the calculation accuracy. In some embodiments, the angle interval may be 0 degrees, 10 degrees, 20 degrees, 30 degrees, etc. The angle interval may be added and/or adjusted according to the direction correction function.

In some embodiments, the generated direction map may be verified to compare the accuracy through a blocking manner. For instance, in each block, a direction of each pixel may be counted to determine a main direction of each block, and then compared with a direction in a test image. The more parallel the main direction of each block is to the direction of the test image, the higher the accuracy may be. The test image may be a map including direction information, and the test image may be used to test the accuracy of the generated direction map. In some embodiments, the test image may be randomly generated, which only needs to include information from different angles. Merely by way of example, the main direction of each block of the direction map may be represented by a line of one color (e.g., red), the direction information in the test image may be represented by a line of another color (e.g., black), and then the line in the red direction in the direction map and the line in the black direction in the test image may be fitted. If the line in the red direction and the line in the black direction can be fitted, a result of the direction map may be relatively accurate, otherwise, the result of the direction map may not be accurate. In some embodiments, the test image may include information of multiple angles as much as possible, so as to verify the accuracy of the angles in the direction map.

According to some embodiments of the present disclosure, compared with the normal manner such as a gradient-based algorithm, by determining the direction map based on the at least one eigenvector, the calculation amount may be reduced, the calculation efficiency may be improved, and the result of the edge enhancement on the image may not be affected. For the ultrasound image, since the frame rate of the image is relatively high (e.g., the frame rate of the cardiac ultrasound image may reach 100 frames or more), the efficiency of the direction map determination based on the at least one eigenvector may be significantly improved.

In 530, the second image may be obtained by performing the edge enhancement on the initial image based on the image mask and the direction map.

In some embodiments, the processing device may obtain the second image by performing a filtering operation on the initial image based on the image mask and the direction map. The filtering operation may include a Gabor filtering operation, etc. The second image may be an image generated by performing the edge enhancement. The noise in the ultrasound image may affect the image quality (e.g., blur the edge and detail information). Therefore, in addition to the speckle noise reduction, the edge enhancement may also be performed on the ultrasound image according to requirements.

The Gabor filtering operation may have frequency selectivity and direction selectivity. Using the Gabor filtering operation to enhance the texture of the ultrasound image may have a good robustness. The texture may reflect other visual features in the image other than the color. For example, the texture may be a grayscale distribution of a pixel in the image and a surrounding region of the pixel.

In some embodiments, for the 2D image, a Gabor filter for performing the Gabor filtering operation may be represented according to the following equation:

$$h(x, y{:}\phi, f) = \exp\left\{-\frac{1}{2}\left[\frac{(x\cos\phi)^2}{\delta_x^2} + \frac{(y\sin\phi)^2}{\delta_y^2}\right]\right\}\cos(2\pi f x\cos\phi), \tag{21}$$

where h(x, y: $\phi$, f) denotes the Gabor filter, $\phi$ denotes a direction of the Gabor filter, f denotes texture frequency information, $\delta_x$ and $\delta_y$ denote space constants of a Gaussian envelope along x and y axes, (x, y) denotes a pixel point, and exp denotes an exponential function.

In some embodiments, for the 3D image, a Gabor filter for performing the Gabor filtering operation may be represented according to the following equation:

$$h(x, y, z{:}\phi, f) =$$

$$\exp\left\{-\frac{1}{2}\left[\frac{(x\cos\phi)^2}{\delta_x^2} + \frac{(y\sin\phi)^2}{\delta_y^2} + \frac{(z\sin\phi)^2}{\delta_z^2}\right]\right\}\cos(2\pi f x\cos\phi), \tag{22}$$

where h(x, y, z: $\phi$, f) denotes the Gabor filter, (x, y, z) denotes a pixel point, exp denotes an exponential function, $\delta_x$, $\delta_y$, and $\delta_z$ denote space constants of a Gaussian envelope along the x, y, and z axes, and other symbols denote similar meanings to those in Equation (21), which is not repeated herein.

In some embodiments, three parameters may be specified for performing the Gabor filtering operation on the image. The three parameters may include a frequency map, a direction map, and a Gaussian envelope. The frequency map may represent texture frequency information f at each pixel point. In some embodiments, the frequency map may be determined from a sinusoidal plane wave of the texture, or may be determined experimentally. In some embodiments, the texture frequency information may be set according to empirical values, and may also be adjusted according to specific conditions.

The selection of spatial constants of the Gaussian envelope (e.g., $\delta_x$, $\delta_y$, and $\delta_z$) may involve a balance. If values selected by the spatial constants is relatively large, the robustness of the filter to the noise may be relatively strong, but false edges may be generated. If the values selected by the spatial constants are relatively small, the filtering effect may be relatively poor. Therefore, an appropriate value should be selected after comprehensive consideration. In some embodiments, the space constants of the Gaussian envelope may be determined based on empirical values, determined experimentally, etc.

In some embodiments, the processing device may use the image mask and the direction map to guide the Gabor filtering operation.

In some embodiments, for the 2D image, a filtering operation may be represented according to the following equation:

$$E(x, y) = \begin{cases} 0, & M(x, y) = 0 \quad (23) \\ \sum_{a=-\frac{s}{2}}^{\frac{s}{2}}\sum_{b=-\frac{s}{2b}}^{\frac{s}{2b}}I(x-a, y-b) & \text{otherwise} \\ h(a, b{:}O(x, y), F(x, y)), \end{cases}$$

where E denotes a filtering result map, E(x,y) denotes a filtering result at a pixel point (x, y), M denotes an image mask, M(x, y) denotes edge information at the pixel point (x, y), O denotes a direct map, O(x, y) denotes direction information at the pixel point (x, y), F denotes a frequency map, F(x, y) denotes texture frequency information at the pixel point (x, y), I denotes an initial ultrasound image (e.g., the initial image), s denotes a dimension of a Gaussian filter kernel, h denotes a generation function of the Gaussian filter, and a and b denote variables of a summation function. In some embodiments, the dimension s of the Gaussian filter kernel may relate to the frequency, and may not be adjusted as a parameter.

In some embodiments, for the 3D image, a filtering operation may be represented according to the following equation:

$$E(x, y, z) = \quad (24)$$

$$\begin{cases} 0, & M(x, y, z) = 0 \\ \sum_{a=-\frac{s}{2}}^{\frac{s}{2}}\sum_{b=-\frac{s}{2}}^{\frac{s}{2}}\sum_{c=-\frac{s}{2}}^{\frac{s}{2}}I(x-a, y-b, z-c) & \text{otherwise} \\ h(a, b, c{:}O(x, y, z), F(x, y, z)), \end{cases}$$

where E denotes a filtering result map, E(x,y, z) denotes a filtering result at a pixel point (x, y, z), M denotes an image mask, M(x, y, z) denotes edge information at the pixel point (x,y), O denotes a direct map, O(x, y, z) denotes direction information at the pixel point (x,y), F denotes a frequency map, F(x, y, z) denotes texture frequency information at the pixel point (x, y, z), a, b, and c denote variables of a summation function, and other symbols denote similar meanings to those in Equation (23).

In some embodiments, the processing device may obtain the filtering result map generated by performing the edge enhancement according to Equation (23) or Equation (24) to perform the Gabor filtering operation on the initial image based on the image mask and the direction map, and designate the filtering result map as the second image.

In some embodiments, the processing device may also perform the edge enhancement in other manners, such as, an unsharp masking, a shock filter, a machine learning model, etc.

Figure 6:
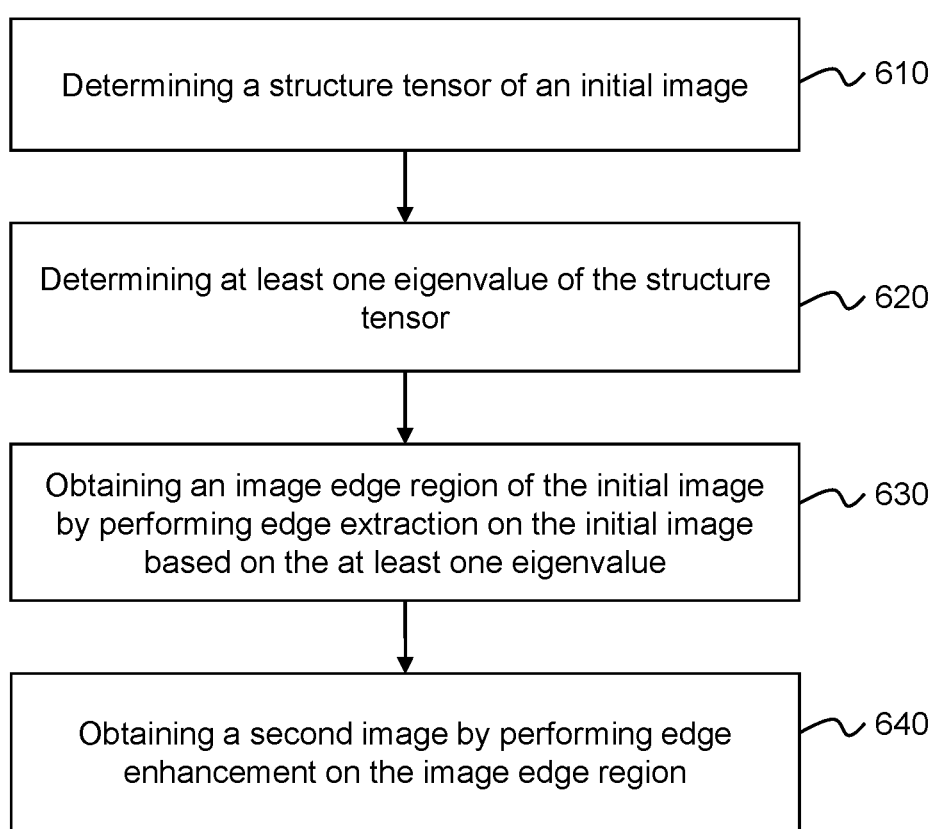
FIG. 6 is a flowchart illustrating an exemplary process for image enhancement according to some embodiments of the present disclosure.

FIG. 6 is a flowchart illustrating an exemplary process 600 for image enhancement according to some embodiments of the present disclosure.

As illustrated in FIG. 6, the process 600 may include one or more of the following operations. In some embodiments, the obtaining the second image by performing the edge enhancement on the initial image in operation 320 may be implemented according to the process 600. In some embodiments, the process 600 may be performed by a processing device (e.g., the processing device 140) or the image processing module 220.

In 610, a structure tensor of the initial image may be determined. More descriptions regarding the determination of the structure tensor of the initial image may be found in elsewhere in the present disclosure (e.g., operation 320 and the descriptions thereof), which is not repeated herein.

In 620, at least one eigenvalue of the structure tensor may be determined. More descriptions regarding the determination of the at least one eigenvalue of the structure tensor may be found in elsewhere in the present disclosure (e.g., operation 420 and the descriptions thereof), which is not repeated herein.

In some embodiments, after the at least one eigenvalue is determined, the processing device may perform operation 630 to perform edge extraction on the initial image based on the at least one eigenvalue. In some embodiments, after the at least one eigenvalue is determined, the processing device may obtain at least one corrected eigenvalue by correcting the at least one eigenvalue, and then perform operation 630 to perform the edge extraction on the initial image based on the at least one corrected eigenvalue. More descriptions regarding the correction of the at least one eigenvalue may be found in elsewhere in the present disclosure (e.g., operation 420 and the descriptions thereof), which is not repeated herein.

In 630, an image edge region of the initial image may be obtained by performing the edge extraction on the initial image based on the at least one eigenvalue.

In some embodiments, for each pixel (i.e., a pixel point) in the initial image, the processing device may determine two target eigenvalues of the pixel from the at least one eigenvalue (e.g., a plurality of eigenvalues) corresponding to the pixel. In some embodiments, if the initial image is a 3D image, the at least one eigenvalue may include three eigenvalues, and the processing device may determine an eigenvalue with a maximum value and an eigenvalue with a minimum value among the three eigenvalues as the two target eigenvalues. In some embodiments, if the initial image is a 2D image, the at least one eigenvalue may include two eigenvalues, and the processing device may determine the two eigenvalues as the two target eigenvalues.

In some embodiments, the processing device may determine whether the pixel is located at an image edge of the initial image according to whether a difference between the two target eigenvalues is larger than a second preset threshold. In some embodiments, if the difference between the two target eigenvalues is larger than the second preset threshold, the processing device may determine that the pixel is located at the image edge (i.e., a heterogeneous region) of the initial image. If the difference between the two target eigenvalues is less than or equal to the second preset threshold, the processing device may determine that the pixel is located in an image homogeneous region of the initial image. In some embodiments, the second preset threshold may be equal to the first preset threshold.

In some embodiments, the difference between the two target eigenvalues may be an absolute value of a difference between absolute values of the two target eigenvalues. In some embodiments, the second preset threshold may be determined according to Equation (17) or Equation (18). More descriptions regarding the determination of the image mask may be found in elsewhere in the present disclosure (e.g., operation 420 and the descriptions thereof), which is not repeated herein.

In some embodiments, the processing device may obtain the image edge region based on each extracted pixel located at the image edge of the initial image. For instance, all the pixels determined to be located at the image edge of the initial image may be combined to obtain the image edge region.

In 640, the second image may be obtained by performing the edge enhancement on the image edge region.

In some embodiments, the processing device may perform the edge enhancement on the determined image edge region of the initial image, and determine the processed image as the second image. For example, the image edge region may be filtered through the manners illustrated in operations 520-530, and the obtained image may be designated as the second image. The above description is merely provided for the purposes of illustration, and is not intended to limit the scope of the present disclosure.

According to some embodiments of this description, by only performing the edge enhancement on the determined image edge region, the data volume of the image processing may be reduced, and the workload may be reduced. No unnecessary edge enhancement may be performed on the homogeneous region, which improves the processing speed and the processing efficiency of the image.

FIG. 7 is a flowchart illustrating an exemplary process 700 for image enhancement according to some embodiments of the present disclosure.

As illustrated in FIG. 7, the process 700 may include one or more of the following operations. In some embodiments, the performing the speckle noise reduction and the edge enhancement on the initial image, respectively, in operation 320 may be implemented according to the process 700. In some embodiments, the process 700 may be performed by a processing device (e.g., the processing device 140) or the image processing module 220.

In 710, a structure tensor of the initial image may be determined. More descriptions regarding the determination of the structure tensor of the initial image may be found in elsewhere in the present disclosure (e.g., operation 320 and the descriptions thereof), which is not repeated herein.

In 720, at least one eigenvalue of the structure tensor may be determined. More descriptions regarding the determination of the at least one eigenvalue of the structure tensor may be found in elsewhere in the present disclosure (e.g., operation 420 and the descriptions thereof), which is not repeated herein.

In 730, the at least one eigenvalue may be corrected to obtain at least one corrected eigenvalue. More descriptions regarding the correction of the at least one eigenvalue may be found in elsewhere in the present disclosure (e.g., operation 420 and the descriptions thereof), which is not repeated herein.

In 740, the speckle noise reduction and/or the edge enhancement may be performed on the initial image based on the at least one corrected eigenvalue, respectively.

In some embodiments, the processing device may perform the speckle noise reduction and/or the edge enhancement on the initial image based on the at least one corrected eigenvalue, respectively. The speckle noise reduction and the edge enhancement may be performed in parallel or successively. More descriptions regarding the performing the speckle noise reduction on the initial image based on the at least one corrected eigenvalue may be found in elsewhere in the present disclosure (e.g., operation 320, FIG. 4, and the descriptions thereof), which is not repeated herein. More descriptions regarding the performing the edge enhancement on the initial image based on the at least one corrected eigenvalue may be found in elsewhere in the present disclosure (e.g., operation 320, FIGS. 5 and 6, and the descriptions thereof), which is not repeated herein.

According to some embodiments of the present disclosure, by correcting initial eigenvalues, and performing the speckle noise reduction and/or the edge enhancement on the initial image based on the corrected eigenvalues, a consistency between the corrected eigenvalues and the features of the image may be improved, thereby improving the effect of the image processing.

FIG. 8 is a flowchart illustrating an exemplary process 800 for image enhancement according to some embodiments of the present disclosure.

As illustrated in FIG. 8, the process 800 may include one or more of the following operations. In some embodiments, the obtaining the target image by performing the fusion operation based on the first image and the second image in operation 330 may be implemented according to the process 800. In some embodiments, the process 800 may be performed by a processing device (e.g., the processing device 140) or the image fusion module 230.

In 810, a screened second image may be obtained by screening the second image.

The edge enhancement is usually used to enhance a relatively large texture region. In order to avoid introducing too much noise in the edge enhancement, edge enhancement results may be further screened. If noise is introduced into the edge-enhanced image (e.g., a lot of unnecessary information is enhanced), directly fusing the edge-enhanced image with the speckle-noise-reduced image may cause some bright spots in the fusion image, which significantly affects the quality of the ultrasound image. In some embodiments, the processing device may screen the second image (i.e., the edge-enhanced image). The screening may be performed using various algorithms, such as, a morphological operation, a screening algorithm based on features (e.g., a contour area, a contour perimeter, etc.), a machine learning algorithm, etc. In some embodiments, the screening of the second image may be performed through a findContours function in Equation (25). The findContours function may be used to screen the edge enhancement results.

In some embodiments, the processing device may screen the second image through the morphological operation. For example, the second image may be screened according to a shape, a size, a color, etc., of a subject (e.g., an ROI, a connection domain, etc.) in the second image. In some embodiments, during the screening process, the processing device may perform morphological operations (e.g., an erosion operation, a dilation operation, an opening operation, a closing operation, etc.) on the subject in the second image.

In some embodiments, the processing device may screen the second image based on the features, such as, the contour area, the contour perimeter, etc. The second image may include one or more sets of edge information, and each set of edge information may be independent. In some embodiments, the processing device may count the edge information (e.g., the contour area and/or the contour perimeter) of each edge in the second image, and screen the second image. Merely by way of example, if the contour area and/or the contour perimeter of the edge is relatively small (e.g., smaller than a preset threshold), the corresponding edge may be removed. In some embodiments, the processing device may also use the machine learning algorithm to classify the contours to screen the second image.

In some embodiments, the processing device may screen the second image in other manners, such as, using a neural network model, etc.

In 820, the target image may be determined by fusing the first image and the screened second image.

In some embodiments, after the second image is screened, the processing device may fuse the first image with the screened second image, so as to obtain the target image. The target image may be generated by processing the initial image using the speckle noise reduction and the edge enhancement. The target image may be generated by fusing the first image and the screened second image, which may significantly improve the image quality, and effectively avoid introducing too much noise.

In some embodiments, the processing device may fuse a speckle noise reduction result image and an edge enhancement result image to obtain a fusion result image, and designate the fusion result image as the target image. The process of the image fusion may be illustrated as Equation (25) in operation 910.

In some embodiments, the processing device may perform the image fusion in other manners, such as, using a machine learning model, etc.

According to some embodiments of the present disclosure, by screening the edge-enhanced image, the noise that may be in the edge-enhanced image may be avoided, which improves the processing efficiency of the image. By fusing the speckle-noise-reduced image and the screened edge-enhanced image, the final image-enhanced initial image may be obtained, which reduces the speckle noise of the image while retaining edge details of the image, further ensuring and improving the quality of the processed image.

FIG. 9 is a flowchart illustrating an exemplary process 900 for image enhancement according to some embodiments of the present disclosure.

As illustrated in FIG. 9, the process 900 may include one or more of the following operations. In some embodiments, the process 900 may be performed by a processing device (e.g., the processing device 140) or the image fusion module 230.

In 910, a first fusion image may be obtained by performing a fusion operation on a first image and a second image.

In some embodiments, the processing device may screen the second image to obtain the filtered second image. More descriptions regarding the screen of the second image may be found in elsewhere in the present disclosure (e.g., operation 810 and the descriptions thereof), which is not repeated herein.

In some embodiments, the processing device may fuse the first image and the screened second image to obtain the first fusion image.

In some embodiments, the processing device may obtain the first fusion image by fusing the first image and the screened second image based on a first weighting value corresponding to the first image and a second weighting value corresponding to the screened second image. The first weighting value may be negatively correlated to the second weighting value.

In some embodiments, the image fusion of the first image and the screened second image may be represented according to the following equation:

$$H=(1-d_1 w)R+w\cdot \text{findContours}(E), \tag{25}$$

where H denotes a fusion result image (i.e., the first fusion image), R denotes a speckle noise reduction result image (i.e., the first image), findContours denotes a function for screening an edge enhancement result image, E denotes an edge enhancement result image (i.e., the second image), findContours(E) denotes a screened edge enhancement result image (i.e., the screened second image), $d_1$ denotes an edge enhancement weighting value. In some embodiments, the first weighting value may be w, and the second weighting value may be $1-d_1 w$. That is, the first weighting value may be negatively correlated to the second weighting value.

In 920, a second fusion image may be obtained by performing a fusion operation on the first fusion image and the initial image.

In some embodiments, the processing device may obtain the second fusion image by fusing the first fusion image and the initial image based on a third weighting value corresponding to the first fusion image and a fourth weighting value corresponding to the initial image. A sum of the third weighting value and the fourth weighting value may be 1.

In some embodiments, the image fusion of the first fusion image and the initial image may be represented according to the following equation:

$$H'=(1-d_2)S+d_2 H, \tag{26}$$

where H' denotes a second fusion result image (i.e., the second fusion image), H denotes a first fusion result image (i.e., the first fusion image), S denotes the initial image, $d_2$ denotes the third weighting value (i.e., a weighting value corresponding to the first fusion image), $1-d_2$ denotes the fourth weighting value (i.e., a weighting value corresponding to the initial image), and the sum of the third weighting value and the fourth weighting value is 1.

In some embodiments, the processing device may perform the fusion operation on the first fusion image and the initial image in other manners, such as, using a machine learning model, etc.

According to some embodiments of the present disclosure, by performing the fusion operation on the first fusion image obtained by fusing the speckle-noise-reduced image and the edge-enhanced image and the initial image, initial information of the 3D image may be preserved while performing 3D speckle noise reduction and 3D edge enhancement on the 3D image.

In 930, an updated second fusion image may be obtained by iteratively updating the second fusion image, and the updated second fusion image may be determined as the target image. In some embodiments, the processing device may designate the second fusion image as an updated initial image, and iteratively update the second fusion image until an iteration termination condition is satisfied.

In some embodiments, the processing device may designate the second fusion image as the updated initial image, and then perform operations 910 and 920 on the updated initial image. The above-mentioned operations may be repeated to iteratively update the second fusion image until the iteration termination condition is satisfied. The final updated second fusion image may be determined as the target image.

In some embodiments, the processing device may perform one or more iterations. Each of the one or more iterations may include obtaining an updated first image by performing the speckle noise reduction on the updated initial image and an updated second image by performing the edge enhancement on the updated initial image; obtaining an updated first fusion image by performing a fusion operation on the updated first image and the updated second image; and obtaining the updated second fusion image by performing a fusion operation on the updated first fusion image and the updated initial image.

In some embodiments, the processing device may determine whether the iteration termination condition is satisfied after each iteration is performed. If the iteration termination condition is satisfied, the processing device may terminate the iteratively updating of the second fusion image, and determine the updated second fusion image as the target image.

In order to improve the image quality as high as possible under a condition of satisfying the image rate requirement, in some embodiments, the iteration termination condition may be determined based on the image processing rate requirements and/or image quality requirements.

In some embodiments, the iteration termination condition may include that a count of iterations reaches a preset count, a change degree between gray values of two second fusion images obtained in two adjacent iterations is less than a third preset threshold, or the like, or any combination thereof.

In some embodiments, the iteration termination condition may be a preset count of iterations. For instance, if a requirement of a frame rate (a count of frames or images shown or displayed per second) is relatively high, a relatively small count of iterations (e.g., 1 time) may be set. If the requirement of the frame rate is relatively low, a relatively large count of iterations (e.g., 3-5 times) may be set.

In some embodiments, the iteration termination condition may be that the change degree of the gray values of the second fusion images obtained by two adjacent iterations is less than the third preset threshold. The third preset threshold may be determined based on experience or user requirements. For example, the higher the user requirement for image quality is, the less the third preset threshold may be. As another example, the third preset threshold that can meet an image quality requirement may be obtained based on historical data.

According to some embodiments of the present disclosure, by iteratively enhancing the initial image, the initial information of the 3D image may be preserved while performing the 3D speckle noise reduction and the 3D edge enhancement on the 3D image. At the same time, different user requirements for the image speckle noise reduction and the image definition may be satisfied.

FIG. 12 is a schematic diagram illustrating an exemplary process 1200 for image enhancement according to some embodiments of the present disclosure.

As illustrated in FIG. 12, a processing device (e.g., the processing device 140) may perform the process 1200 to obtain a target image by performing image enhancement on an initial image.

As illustrated in FIG. 12, in some embodiments, the processing device may obtain and input an initial ultrasound image (i.e., an initial image) of a target subject (e.g., a living body, a phantom, etc.) for the image enhancement through operation 1210. In some embodiments, after the initial image is obtained, the processing device may continue to perform operation 1220 or iteratively perform operations 1230-1270.

In some embodiments, after the initial image is obtained, the processing device may perform a filtering operation (e.g., a 3D Gaussian filtering operation, etc.) on the initial image through operation 1220, and then iteratively update the filtered image by repeatedly performing operations among operations 1230-1270.

In some embodiments, the processing device may iteratively update the input initial image by repeatedly performing operations 1230-1270. That is, the processing device may iteratively perform the image enhancement on the input initial image. The image enhancement may include the speckle noise reduction in operation 1240 and the edge enhancement in operation 1250.

In each iteration, the ultrasound image may be input through operation 1230 at first. The ultrasound image may be a second fusion image 1270 obtained after a last iteration. For the first iteration, the input ultrasound image may be the initial image. After operations 1240 and 1250 are performed on the image input in operation 1230, a first fusion image 1260 may be obtained. Operations 1240 and 1250 may be performed in parallel. Then, the image input in operation 1230 may be fused with the first fusion image 1260 to obtain the second fusion image 1270. Whether an iteration termination condition is satisfied (e.g., whether a current iteration count is larger than or equal to a preset value N) may be determined. If the iteration termination condition is not satisfied (e.g., the count of iterations is less than N), the current second fusion image 1270 may be used as the input image for a next iteration, and the iteration may be continued. If the iteration termination condition is satisfied (e.g., the count of iterations is larger than or equal to N), operation 1280 may be performed to output an image. That is, the current second fusion image 1270 may be designated as the target image.

FIG. 13 is a schematic diagram illustrating an exemplary process 1300 for image enhancement according to some embodiments of the present disclosure.

As illustrated in FIG. 13, a processing device (e.g., the processing device 140) may perform the process 1300 to obtain a target image by performing image enhancement on an initial image.

As illustrated in FIG. 13, in some embodiments, similar to operation 1210, the processing device may obtain and input an initial ultrasound image (i.e., an initial image) of a target subject (e.g., a living body, a phantom, etc.) for the image enhancement through operation 1310. In some embodiments, after the initial image is obtained, the processing device may continue to perform operation 1320 or perform operations 1330 and 1340.

In some embodiments, similar to operation 1220, after the initial image is obtained, the processing device may perform a filtering operation (e.g., a 3D Gaussian filtering operation, etc.) on the initial image through operation 1320, and then perform operations 1330 and 1340.

In some embodiments, the processing device may perform speckle noise reduction on the initial image or the filtered initial image through operation 1330, to obtain the initial image performed the speckle noise reduction (i.e., a first image), and perform edge enhancement on the initial image or the filtered initial image through operation 1340 to obtain the initial image performed the edge enhancement (i.e., a second image). Operation 1330 may be similar to operation 1240, and operation 1340 may be similar to operation 1250. In some embodiments, the processing device may screen the initial image processed using the edge enhancement that is obtained through operation 1340 to obtain a screened image (i.e., a screened second image).

In some embodiments, the processing device may fuse the initial image processed using the speckle noise reduction that is obtained through operation 1330 and the screened image that is obtained through operation 1350 to obtain a fusion image through operation 1360, and then perform operation 1370 to output the fusion image. That is, the fusion image may be designated as a target image to output.

It should be noted that the descriptions of the processes 300, 400, 500, 600, 700, 800, 900, 1200, and 1300 are provided for the purposes of illustration, and are not intended to limit the scope of the present disclosure. For persons having ordinary skills in the art, various variations and modifications to the processes 300, 400, 500, 600, 700, 800, 900, 1200, and 1300 may be conducted under the teaching of the present disclosure. However, those variations and modifications may not depart from the protection of the present disclosure. For example, after operation 1250, the screening operation shown in operation 1350 may be performed on the obtained image, and the screened image may be fused with the image obtained in operation 1240 to obtain the first fusion image 1260.

FIG. 14 is a block diagram illustrating an exemplary image enhancement system 1400 according to some embodiments of the present disclosure.

As illustrated in FIG. 14, in some embodiments, the image enhancement system 1400 may include an obtaining module 1410, a speckle noise reduction module 1430, an edge enhancement module 1440, and a fusion module 1450.

In some embodiments, the obtaining module 1410 may be configured to obtain an initial ultrasound image (i.e., an initial image). In some embodiments, the obtaining module 1410 may be equivalent to the image obtaining module 210.

In some embodiments, the image enhancement system 1400 may further include a filtering module 1420. The filtering module 1420 may be configured to perform a filtering operation on the acquired ultrasound image. In some embodiments, the filtering module 1420 may be equivalent to the filtering processing module 240.

In some embodiments, the speckle noise reduction module 1430 may be configured to perform speckle noise reduction (i.e., speckle reduction) on the ultrasound image to obtain a speckle-noise-reduced image (i.e., the first image).

In some embodiments, the edge enhancement module 1440 may be configured to perform edge enhancement on the ultrasound image to obtain an edge-enhanced image (i.e., the second image). In some embodiments, a combination of the speckle noise reduction module 1430 and the edge enhancement module 1440 may be equivalent to the image processing module 220.

In some embodiments, the fusion module 1450 may be configured to fuse the speckle-noise-reduced image and the edge-enhanced image to obtain a first fusion image, and fuse the first fusion image with the initial ultrasound image to obtain a second fusion image. The second fusion image may be designated as a result image (i.e., a target image).

In some embodiments, the fusion module 1450 may iteratively perform the image fusion. That is, the second fusion image may be designated as the initial ultrasound image for iteratively updating, and the second fusion image that satisfies an iteration termination condition may be designated as a final result image (i.e., the target image).

In some embodiments, the image enhancement system 1400 may further include an iteration control module 1460. The iteration control module 1460 may be configured to control a count of iterations, stop the iteration when the count of iterations reaches a set value, and output the final result image. In some embodiments, a combination of the fusion module 1450 and the iteration control module 1460 may be equivalent to the image fusion module 230.

FIG. 15 is a schematic diagram illustrating an exemplary image enhancement device 1500 according to some embodiments of the present disclosure.

As illustrated in FIG. 15, in some embodiments, the image enhancement device 1500 may include a processor 1510, an internal memory 1520, a non-volatile storage medium 1530, a system bus 1540, an input/output (I/O) interface 1550, a communication interface 1560, an input device 1570, and a display unit 1580. The internal memory 1520 and the non-volatile storage medium 1530 may form a memory.

The processor 1510, the memory, the communication interface 1560, the input device 1570, and the display unit 1580 may be connected directly or indirectly through the system bus 1540. The communication interface 1560, the input device 1570, and the display unit 1580 may be connected to the system bus 1540 through the input/output interface 1550. The non-volatile storage medium 1530 may store an operating system and computer programs. The internal memory 1520 may provide an environment for the operation of the operating system and the computer programs in the non-volatile storage medium 1530. When the computer programs stored in the non-volatile storage medium 1530 are executed by the processor 1510, the image processing method shown in some embodiments of the present disclosure may be implemented. The communication interface 1560 may be used for wired or wireless communication with external terminal(s). The display unit 1580 may include various display devices, such as, a liquid crystal display, an electronic ink display, etc. The input device 1570 may include a touch layer covered on a touch screen, buttons disposed on a housing of a computer device, a trackball, a touchpad, an external keyboard, a touchpad, a mouse, or the like, or any combination thereof.

The possible beneficial effects of the embodiments of the present disclosure may include but not limited to the following: (1) by performing the speckle noise reduction and the edge enhancement on the ultrasound image in parallel based on the structure tensor, the calculation may be accelerated and repeated operations may be reduced, which improves the efficiency of the ultrasound image processing; (2) by obtaining the image mask based on the structure tensor, an accuracy of an area of interest to be filtered may be improved, which avoids unnecessary calculations, and improves the operation efficiency and filtering efficiency; (3) by obtaining the direction map based on the structure tensor, the calculation amount of the direction map may be reduced, and the corrected direction map may include accurate pixel direction information, which can be used to improve the edge enhancement effect significantly; (4) a result image that is obtained by performing the edge enhancement and a result image that is obtained by performing the speckle noise reduction may be fused, which effectively avoids introducing too much noise into the edge enhancement result; (5) the operations may be applied to 2D ultrasound images and 3D ultrasound images, which improves the adaptability of the speckle noise reduction and the edge enhancement on various types of images, so that the ultrasound images are corrected more easily and conveniently. It should be noted that different embodiments may have different beneficial effects. In different embodiments, the possible beneficial effects may be any one of the above effects, or any combination thereof, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image enhancement, implemented on a computing device having at least one processor and at least one storage device, the method comprising:

obtaining an initial image;

obtaining a first image and a second image by performing speckle noise reduction and edge enhancement on the initial image in parallel, respectively; and determining a target image by performing a fusion operation on the first image and the second image, wherein the performing the speckle noise reduction on the initial image includes:

determining a structure tensor of the initial image;

determining at least one eigenvector and at least one eigenvalue of the structure tensor;

obtaining at least one corrected eigenvalue by correcting the at least one eigenvalue;

determining a diffusion tensor based on the at least one eigenvector and the at least one corrected eigenvalue; and performing the speckle noise reduction on the initial image based on the diffusion tensor to obtain the first image, wherein the at least one eigenvector includes a two-dimensional (2D) eigenvector or a three-dimensional (3D) eigenvector, the at least one eigenvalue includes two eigenvalues corresponding to the 2D eigenvector or three eigenvalues corresponding to the 3D eigenvector, and the correcting the at least one eigenvalue includes:

obtaining two corrected eigenvalues or three corrected eigenvalues by correcting the at least one eigenvalue in a homogeneous tissue region and an edge region in the initial image, wherein a difference between the two corrected eigenvalues or the three corrected eigenvalues in the homogeneous tissue region is less than or equal to a first preset threshold, and a diffusion of a maximum value among the two corrected eigenvalues or the three corrected eigenvalues is terminated in the edge region.

2. The method of claim 1, wherein the performing speckle noise reduction and edge enhancement on the initial image in parallel, respectively, includes:

performing the speckle noise reduction and the edge enhancement on the initial image based on the structure tensor in parallel, respectively.

3. The method of claim 1, wherein the performing the speckle noise reduction on the initial image based on the diffusion tensor to obtain the first image includes:

obtaining anisotropic diffusion information of the initial image based on the diffusion tensor and image gradient information of the initial image, the anisotropic diffusion information representing a change rate of a gray value of the initial image at a time point; and performing the speckle noise reduction on the initial image based on the anisotropic diffusion information to obtain the first image.

4. The method of claim 2, wherein the performing the speckle noise reduction and the edge enhancement on the initial image based on the structure tensor in parallel, respectively, includes:

determining an image mask and a direction map of the initial image based on the structure tensor; and performing the edge enhancement on the initial image based on the image mask and the direction map to obtain the second image.

5. The method of claim 4, wherein the determining an image mask and a direction map of the initial image based on the structure tensor includes:

determining at least one eigenvalue of the structure tensor; and determining the image mask based on the at least one eigenvalue.

6. The method of claim 4, wherein the determining an image mask and a direction map of the initial image based on the structure tensor includes:

determining at least one eigenvector of the structure tensor; and determining the direction map based on the at least one eigenvector.

7. The method of claim 2, wherein the performing the speckle noise reduction and the edge enhancement on the initial image based on the structure tensor in parallel, respectively, includes:

determining at least one eigenvalue of the structure tensor;

obtaining an image edge region of the initial image by performing edge extraction on the initial image based on the at least one eigenvalue; and performing the edge enhancement on the image edge region to obtain the second image.

8. The method of claim 7, wherein the at least one eigenvalue includes three eigenvalues, and the obtaining an image edge region of the initial image by performing edge extraction on the initial image based on the at least one eigenvalue includes:

for each pixel in the initial image, determining two target eigenvalues of the pixel from the three eigenvalues corresponding to the pixel, the two target eigenvalues including a maximum eigenvalue and a minimum eigenvalue among the three eigenvalues;

determining whether a difference between the two target eigenvalues is greater than a second preset threshold; and in response to determining that the difference between the two target eigenvalues is greater than the second preset threshold, determining that the pixel is located at an image edge of the initial image; and obtaining the image edge region based on a plurality of pixels located at the image edge of the initial image.

9. The method of claim 2, wherein the performing the speckle noise reduction and the edge enhancement on the initial image based on the structure tensor in parallel, respectively, includes:

determining at least one eigenvalue of the structure tensor;

obtaining at least one corrected eigenvalue by correcting the at least one eigenvalue; and performing the speckle noise reduction and the edge enhancement on the initial image based on the at least one corrected eigenvalue, respectively.

10. The method of claim 1, wherein the determining a target image by performing a fusion operation based on the first image and the second image includes:

obtaining a first fusion image by performing a fusion operation on the first image and the second image;

obtaining a second fusion image by performing a fusion operation on the first fusion image and the initial image;

obtaining an updated second fusion image by iteratively updating the second fusion image, wherein the iteratively updating the second fusion image includes:

designating the second fusion image as an updated initial image; and iteratively updating the second fusion image until an iteration termination condition is satisfied; and determining the updated second fusion image as the target image.

11. The method of claim 10, wherein the iteratively updating the second fusion image includes one or more iterations, and each of the one or more iterations includes:

obtaining an updated first image and an updated second image by performing the speckle noise reduction and the edge enhancement on the updated initial image, respectively;

obtaining an updated first fusion image by performing a fusion operation on the updated first image and the updated second image; and obtaining the updated second fusion image by performing a fusion operation on the updated first fusion image and the updated initial image.

12. The method of claim 10, wherein the obtaining a first fusion image by performing a fusion operation on the first image and the second image includes:

obtaining a screened second image by screening the second image; and obtaining the first fusion image by fusing the first image and the screened second image.

13. The method of claim 12, wherein the obtaining the first fusion image by fusing the first image and the screened second image includes:

obtaining the first fusion image by fusing the first image and the screened second image based on a first weighting value corresponding to the first image and a second weighting value corresponding to the screened second image, wherein the first weighting value is negatively correlated to the second weighting value.

14. The method of claim 10, wherein the obtaining a second fusion image by performing a fusion operation on the first fusion image and the initial image includes:

obtaining the second fusion image by fusing the first fusion image and the initial image based on a third weighting value corresponding to the first fusion image and a fourth weighting value corresponding to the initial image, wherein a sum of the third weighting value and the fourth weighting value is 1.

15. A system for image enhancement, comprising:

at least one storage device including a set of instructions; and at least one processor configured to communicate with the at least one storage device, wherein when executing the set of instructions, the at least one processor is configured to direct the system to perform operations including:

obtaining an initial image;

obtaining a first image and a second image by performing speckle noise reduction and edge enhancement on the initial image in parallel, respectively; and determining a target image by performing a fusion operation on the first image and the second image, wherein the performing the speckle noise reduction on the initial image includes:

determining a structure tensor of the initial image;

determining at least one eigenvector and at least one eigenvalue of the structure tensor;

obtaining at least one corrected eigenvalue by correcting the at least one eigenvalue;

determining a diffusion tensor based on the at least one eigenvector and the at least one corrected eigenvalue; and performing the speckle noise reduction on the initial image based on the diffusion tensor to obtain the first image, wherein the at least one eigenvector includes a two-dimensional (2D) eigenvector or a three-dimensional (3D) eigenvector, the at least one eigenvalue includes two eigenvalues corresponding to the 2D eigenvector or three eigenvalues corresponding to the 3D eigenvector, and the correcting the at least one eigenvalue includes:

obtaining two corrected eigenvalues or three corrected eigenvalues by correcting the at least one eigenvalue in a homogeneous tissue region and an edge region in the initial image, wherein a difference between the two corrected eigenvalues or the three corrected eigenvalues in the homogeneous tissue region is less than or equal to a first preset threshold, and a diffusion of a maximum value among the two corrected eigenvalues or the three corrected eigenvalues is terminated in the edge region.

16. A non-transitory computer readable medium, comprising executable instructions that, when executed by at least one processor, direct the at least one processor to perform a method, the method comprising:

obtaining an initial image;

obtaining a first image and a second image by performing speckle noise reduction and edge enhancement on the initial image in parallel, respectively; and determining a target image by performing a fusion operation on the first image and the second image, wherein the performing the speckle noise reduction on the initial image includes:

determining a structure tensor of the initial image;

determining at least one eigenvector and at least one eigenvalue of the structure tensor;

obtaining at least one corrected eigenvalue by correcting the at least one eigenvalue;

determining a diffusion tensor based on the at least one eigenvector and the at least one corrected eigenvalue; and performing the speckle noise reduction on the initial image based on the diffusion tensor to obtain the first image, wherein the at least one eigenvector includes a two-dimensional (2D) eigenvector or a three-dimensional (3D) eigenvector, the at least one eigenvalue includes two eigenvalues corresponding to the 2D eigenvector or three eigenvalues corresponding to the 3D eigenvector, and the correcting the at least one eigenvalue includes:

obtaining two corrected eigenvalues or three corrected eigenvalues by correcting the at least one eigenvalue in a homogeneous tissue region and an edge region in the initial image, wherein a difference between the two corrected eigenvalues or the three corrected eigenvalues in the homogeneous tissue region is less than or equal to a first preset threshold, and a diffusion of a maximum value among the two corrected eigenvalues or the three corrected eigenvalues is terminated in the edge region.

* * * * *